US012288653B2

(12) United States Patent
Palmer et al.

(10) Patent No.: US 12,288,653 B2
(45) Date of Patent: Apr. 29, 2025

(54) CABLE ENCLOSURE AND ASSEMBLY

(71) Applicant: PREFORMED LINE PRODUCTS CO., Mayfield Village, OH (US)

(72) Inventors: Jacob Palmer, Chesterland, OH (US); Benjamin Franklin Ciesielczyk, Madison, OH (US); Cameron Clines, Chagrin Falls, OH (US); Adam Michael Deel, Bay Village, OH (US); Dan Levac, Gahana, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 398 days.

(21) Appl. No.: 17/439,393

(22) PCT Filed: Mar. 15, 2019

(86) PCT No.: PCT/US2019/022468
§ 371 (c)(1),
(2) Date: Sep. 14, 2021

(87) PCT Pub. No.: WO2020/190257
PCT Pub. Date: Sep. 24, 2020

(65) Prior Publication Data
US 2022/0157542 A1 May 19, 2022

(51) Int. Cl.
H02G 15/10 (2006.01)
H01H 19/04 (2006.01)
(Continued)

(52) U.S. Cl.
CPC ............ H01H 19/08 (2013.01); H01H 19/04 (2013.01); H01H 19/36 (2013.01); H02G 15/10 (2013.01)

(58) Field of Classification Search
CPC . H02G 15/10; H02G 3/08; H02G 3/14; G02B 6/4442; H01R 4/38; H01R 9/2416; H01R 9/2475; H01R 25/006
See application file for complete search history.

(56) References Cited

U.S. PATENT DOCUMENTS 4,360,739 A * 11/1982 Goldstein ............. H05B 47/16
307/157
5,723,833 A * 3/1998 Thrasher ................ H01H 9/287
200/50.12
(Continued)

FOREIGN PATENT DOCUMENTS

WO 2004098008 A1 11/2004

OTHER PUBLICATIONS

Corresponding International Patent Application No. PCT/US2019/022468, International Preliminary Report on Patentability issued Sep. 16, 2021.
(Continued)

Primary Examiner — Timothy J Thompson
Assistant Examiner — Paramita Ghosh
(74) Attorney, Agent, or Firm — Cooper Legal Group, LLC

(57) ABSTRACT

A cable enclosure includes a housing defining an opening through which an interior of the housing is accessible. An end plate is releasably secured to the housing to cover the opening such that the interior of the housing is not accessible. The end plate includes a first conductive leg in electrical communication with a first cable within the housing. The end plate also includes a second conductive leg in electrical communication with a second cable within the housing. The end plate further includes a conductive member movable between a first position and a second position. When in the first position, the conductive member is in contact with the first conductive leg and the second conduc-
(Continued)

tive leg. When in the second position, the conductive member is not in contact with at least one of the first conductive leg or the second conductive leg.

20 Claims, 28 Drawing Sheets

(51) Int. Cl.
*H01H 19/08* (2006.01)
*H01H 19/36* (2006.01)

(56) References Cited

U.S. PATENT DOCUMENTS

| 2010/0150515 | A1* | 6/2010 | Mossner | G02B 6/4459 |
| | | | | 385/135 |
| 2015/0150515 | A1 | 6/2015 | Strachan | |
| 2016/0322182 | A1* | 11/2016 | Lu | H01H 23/168 |

OTHER PUBLICATIONS

Corresponding International Patent Application No. PCT/US2019/022468, International Search Report mailing date Jan. 28, 2020.
Corresponding International Patent Application No. PCT/US2019/022468, Written Opinion of the Searching Authority mailing date Jan. 28, 2020.

\* cited by examiner

CABLE ENCLOSURE AND ASSEMBLY

CROSS-REFERENCE TO RELATED APPLICATIONS

This application claims priority to PCT application PCT/US2019/022468, WO2020190257 titled "CABLE ENCLOSURE AND ASSEMBLY" filed on Mar. 15, 2019, and which is incorporated herein by reference.

TECHNICAL FIELD

The instant application is directed toward a cable enclosure assembly. For example, the instant application is directed toward a cable enclosure assembly having a bonding feature.

BACKGROUND

Cable enclosure assemblies enclose and house splice cables. The cable enclosure assembly may include an end plate to provide access to an interior space within a housing.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a cable enclosure includes a housing defining an opening through which an interior of the housing is accessible. The cable enclosure also includes an end plate releasably secured to the housing to cover the opening such that the interior of the housing is not accessible. The end plate includes a first conductive leg in electrical communication with a first cable within the housing. The end plate also includes a second conductive leg in electrical communication with a second cable within the housing. The end plate further includes a conductive member movable between a first position and a second position. When in the first position, the conductive member is in contact with the first conductive leg and the second conductive leg. When in the second position, the conductive member is not in contact with at least one of the first conductive leg or the second conductive leg.

In an example, a cable enclosure includes a housing defining an opening through which an interior of the housing is accessible. The cable enclosure also includes an end plate releasably secured to the housing between a first orientation relative to the housing and a second orientation relative to the housing. In the first orientation, the end plate does not cover the opening such that the interior of the housing is accessible. In the second orientation, the end plate covers the opening such that the interior of the housing is not accessible. The end plate includes a first conductive leg in electrical communication with a first cable within the housing. The end plate also includes a second conductive leg in electrical communication with a second cable within the housing. The end plate further includes a conductive member movable between a first position and a second position when the end plate is in the second orientation relative to the housing. When in the first position, the conductive member is in contact with the first conductive leg and the second conductive leg. When in the second position, the conductive member is not in contact with at least one of the first conductive leg or the second conductive leg.

In an example, an end plate of a cable enclosure includes a first side and a second side. The end plate is releasably secured to an opening defined by a housing of the cable enclosure such that an interior of the housing is not accessible. The first side faces an exterior of the housing, and the second side faces the interior of the housing. The end plate also includes a first conductive leg in electrical communication with a first cable within the housing. The end plate further includes a second conductive leg in electrical communication with a second cable within the housing. The end plate still further includes a conductive member operatively coupled to the first side and movable between a first position and a second position. When in the first position, the conductive member is in contact with the first conductive leg and the second conductive leg. When in the second position, the conductive member is not in contact with at least one of the first conductive leg or the second conductive leg.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
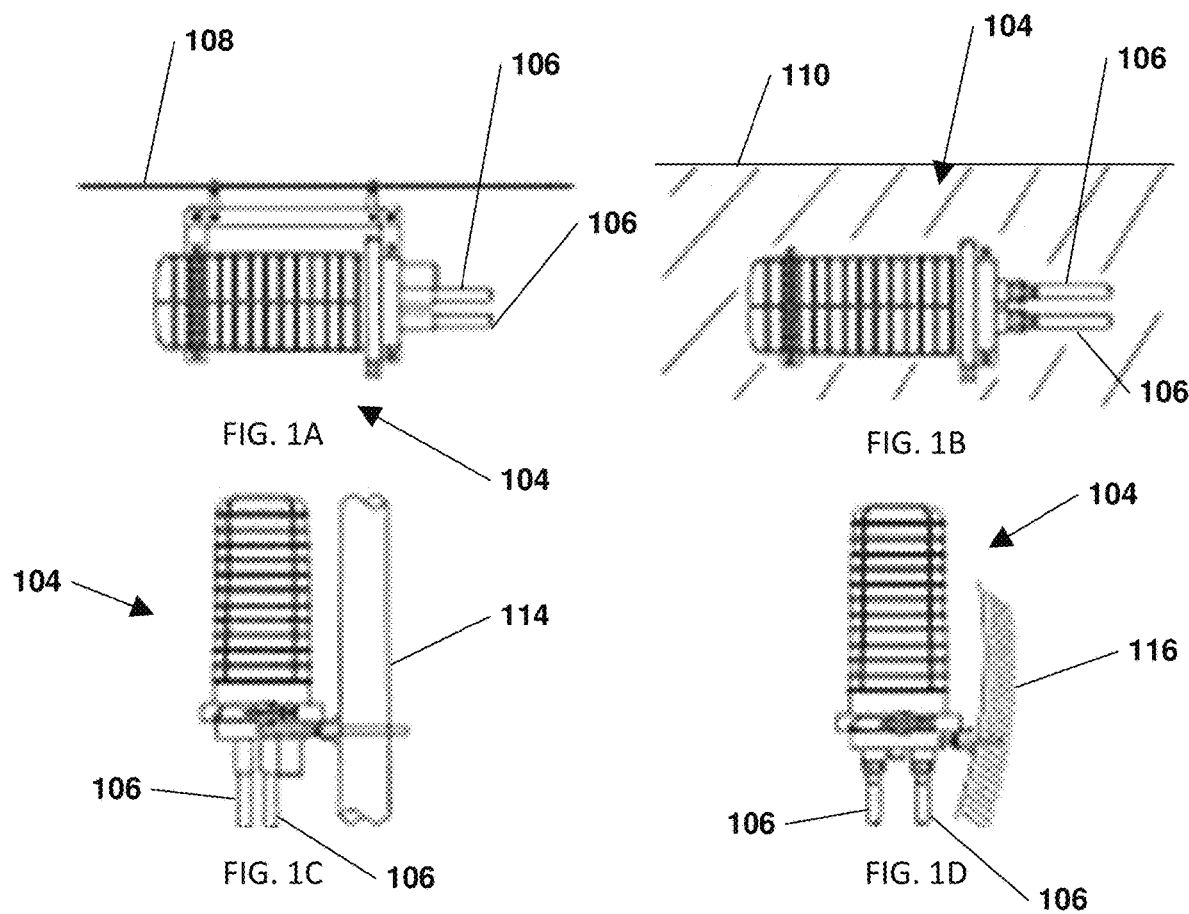
FIG. 1A is an illustration of an example cable enclosure.
FIG. 1B is an illustration of an example cable enclosure.
FIG. 1C is an illustration of an example cable enclosure.
FIG. 1D is an illustration of an example cable enclosure.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

For purposes of clarity, the present disclosure uses the terms telecommunication cables or simply "cables" having one or more telecommunication lines therein. However, such use is only one example, and it is understood and intended that the apparatus of the present disclosure is equally suitable for use with other types of cables including, but not limited to, fiber optic cables, copper wire cables, coaxial cables, drop lines, branch lines, and distribution lines, to name a few. Similarly, the disclosure uses the terms telecommunication line splices, or simply "splices." However, such use is exemplary only, and it is understood and intended that the apparatus of the present disclosure is equally suitable for use with other types of interconnections including, but not limited to, splices, connectors, hybrid connectors, and optical or electrical components, to name a few.

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. A telecommunication cable typically includes a bundle of individual telecommunication lines (either optical fibers or copper wires) that are encased within an exterior sheath. As telecommunication cables are routed across data networks, it is necessary to periodically open the cable so that one or more telecommunication lines therein may be spliced, thereby allowing data to be distributed to other cables or "branches" of the telecommunication network. The cable branches may be further distributed until the network reaches individual user locations such as homes, businesses, offices, and so on.

At each point where a telecommunication cable is opened, it is necessary to provide some type of enclosure to protect the exposed interior of the cable. Commonly, the enclosure has one or more ports through which cables enter and/or exit the enclosure. Once inside the enclosure, the cable is opened to expose the telecommunication lines therein. Telecommunication enclosures are constructed to facilitate the management and protection of individual telecommunication lines and splices thereof. For example, conventional enclosures have re-enterable housings and are designed to incorporate splice trays to assist a craftsman in creating a splice connection between two telecommunication lines. Once all required splices are made, the enclosure is secured to protect the opened portion of the cable from moisture, dust, insects, and other hazards.

Many of these telecommunication cables include a conductive sheath that can be comprised of metal, for example, a metal-sheathed fiber optic cable. These telecommunication cables are sometimes buried underneath a surface of the ground without being encased in a conduit or other, similar rigid protection structure. In the event of damage to a buried telecommunication cable, a craftsman or utility worker can use a tool to send electrical pulses through the metal sheath in telecommunication cables in order to aid location efforts of the damaged telecommunication cable.

Furthermore, each cable enclosure can contain several telecommunication cables at any one time. At times, it can be beneficial to electrically bond each of the telecommunication cables to each other such that the sheaths of each telecommunication cable are at the same magnitude of electrical potential as every other telecommunication cable. The group of bonded telecommunication cables can also be grounded if so desired.

In the event of buried telecommunication cable damage and subsequent location and repair tasks, it can be beneficial to remove a single telecommunication cable from the group of the bonded cables within the enclosure. During the location and repair tasks, the remainder of the cables passing to and from the cable enclosure can be bonded with each other while the cable that is subject to location and repair efforts is temporarily removed from electrical bonding to the other cables within the cable enclosure.

Referring to FIGS. 1A-1D, various example environments for cable enclosure 104 are illustrated. As described above, the cable enclosure 104 can be used in association with telecommunication cables 106 such as a fiber optic cable. In the example of FIG. 1A, the cable enclosure 104 can be suspended from a horizontal support 108 that can be strung between utility poles or other structures. As shown in the example of FIG. 1B, the cable enclosure 104 can be located below a ground surface 110. In an example, the cable enclosure 104 can be located within a manhole. In an example, the cable enclosure 104 can be located within a handhole. As shown in the example of FIG. 1C, the cable enclosure 104 can be mounted in a vertical arrangement such as to a pole 114, conduit, or similar vertical structures. Referring to FIG. 1D, the cable enclosure 104 can be mounted to a non-vertical structure 116. Regardless of the mounting orientation or location, the cable enclosure 104 protects the communication cable and splices within.

Figure 2:
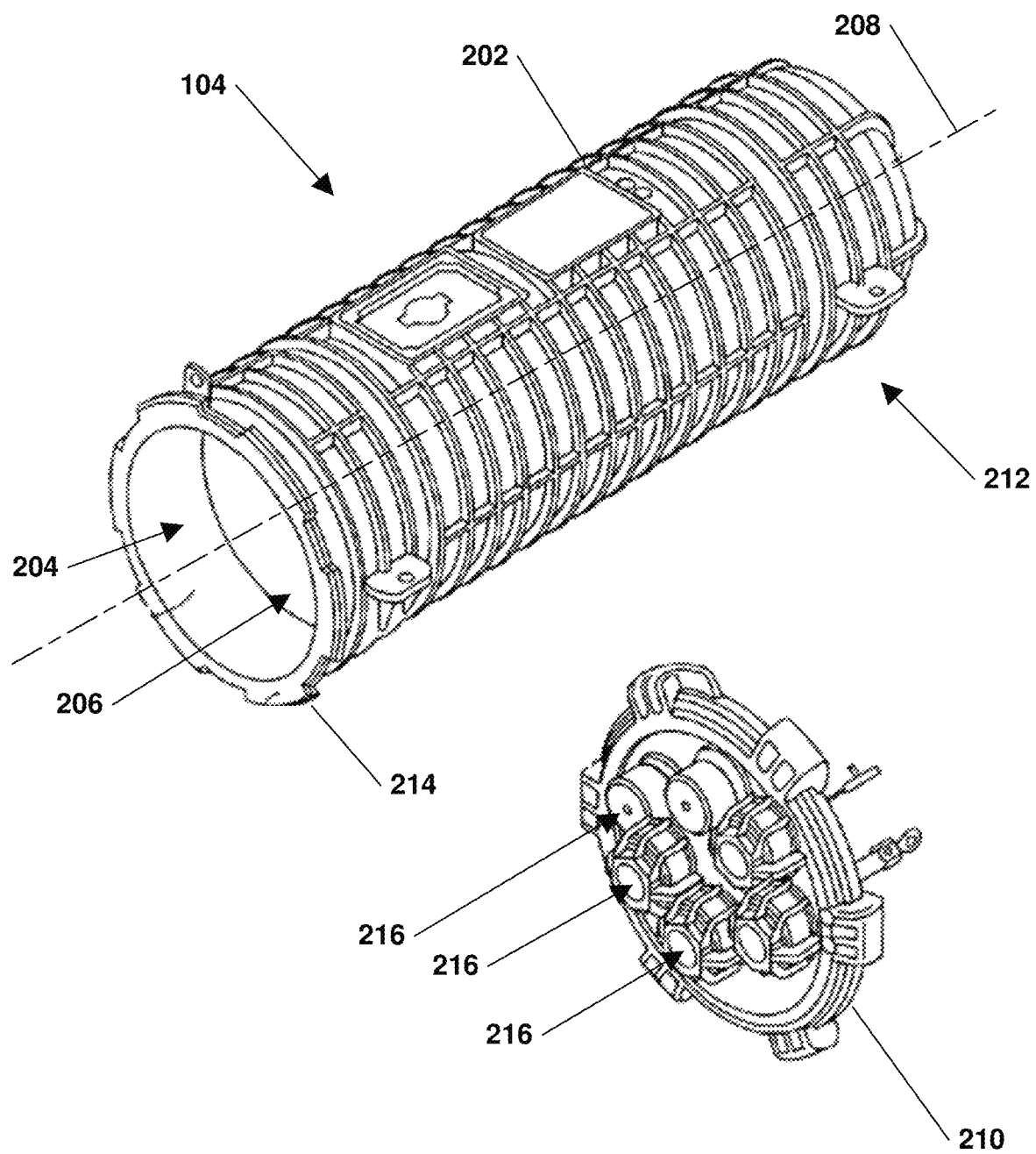
FIG. 2 is an illustration of an example cable enclosure.

Referring to FIG. 2, the cable enclosure 104 includes a housing 202 that can also be termed a dome or dome member. The housing 202 defines an opening 204 through which an interior 206 of the housing 202 is accessible. In the shown example, the housing 202 forms an elongated, generally cylindrical enclosure extending along a central axis 208. The housing 202 further includes a closed end 212 opposite the opening 204. In an example, the housing 202 is a unitary, one-piece structure, however, multiple-piece structures are also contemplated. The interior 206 can be sealed, pressurized, and/or potted as desired to protect the telecommunication cables 106 (shown in FIG. 1) and splices.

The cable enclosure 104 also includes an end plate 210 releasably secured to the housing 202. The end plate 210 covers the opening 204 such that the interior 206 of the housing 202 is not accessible when the end plate 210 is secured to the housing 202.

The end plate 210 can be secured to the cable enclosure 104 in any suitable manner. In an example, a rotatable collar (not shown) can matingly engage a flange 214 attached to the cable enclosure 104 to secure the end plate 210 to the cable enclosure 104 at the opening 204. In an example, a seal member (not shown) is positioned between the flange 214 and the end plate 210 to seal the end of the cable enclosure 104.

Similar to the cable enclosure 104, the end plate 210 can be formed from a variety of different materials using different manufacturing techniques including, but not limited to, injection molding from a suitable plastic containing fibers for reinforcement. For example, fiber glass filled and reinforced polypropylene is one example of suitable material to form the end plate 210.

The end plate 210 can define several apertures 216, or grommets enabling passage of various elements from a space exterior to the cable enclosure 104 to the interior 206 of the housing 202. For example, telecommunication cables 106 (shown in FIG. 1) can pass through one or more apertures 216 from the space exterior to the cable enclosure 104 to the interior 206 of the housing 202. It is to be understood that each aperture 216 can be provided with a gas tight seal or a fluid tight seal between each telecommunication cable 106 and the end plate 210 to prevent undesired passage of gas or fluid into the interior 206. In an example, a one-way valve (not shown) can pass through an aperture 216 to enable pressurization of the interior 206 as previously described.

Figure 3:
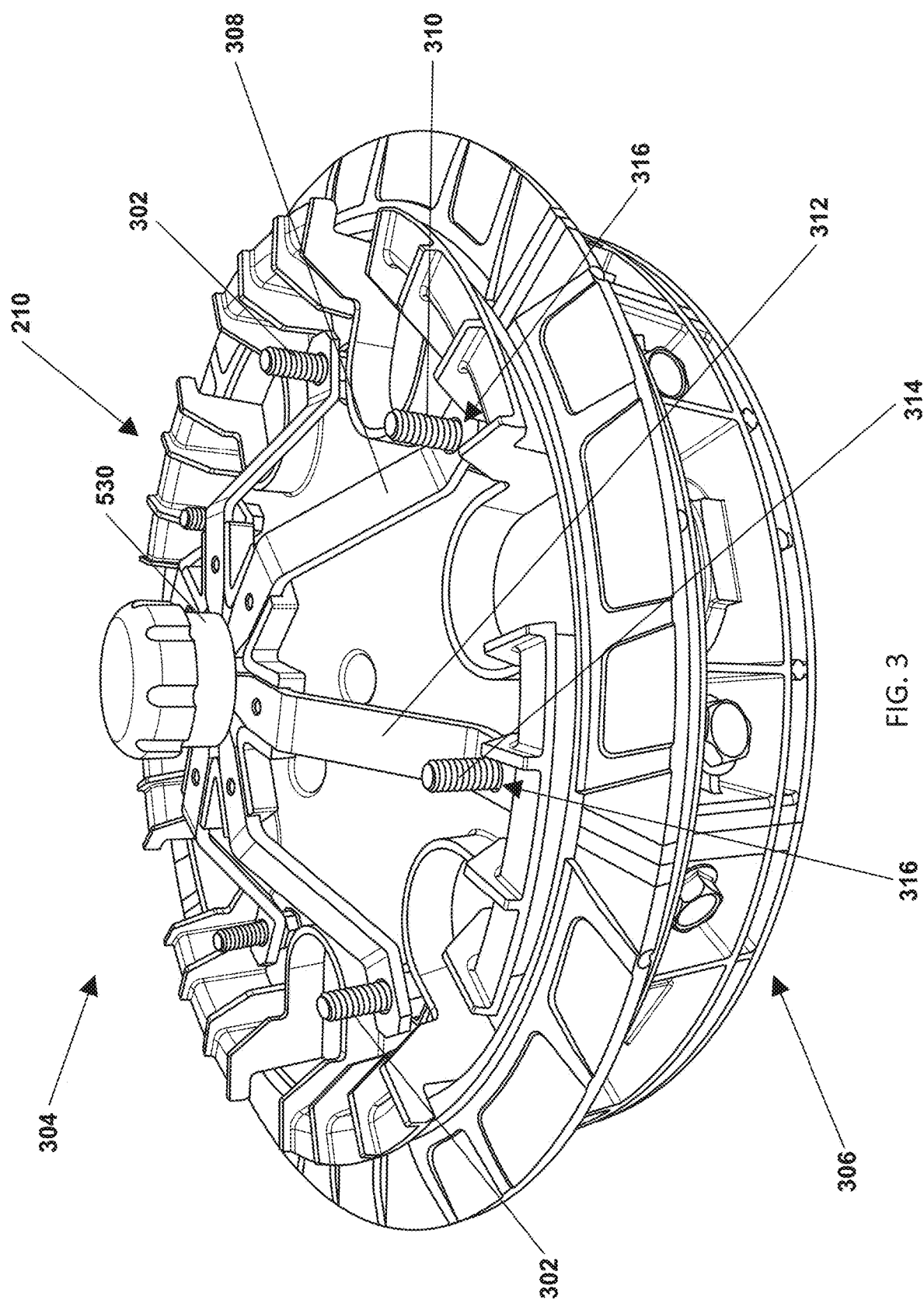
FIG. 3 is an illustration of an example end plate for a cable enclosure.
Figure 27:
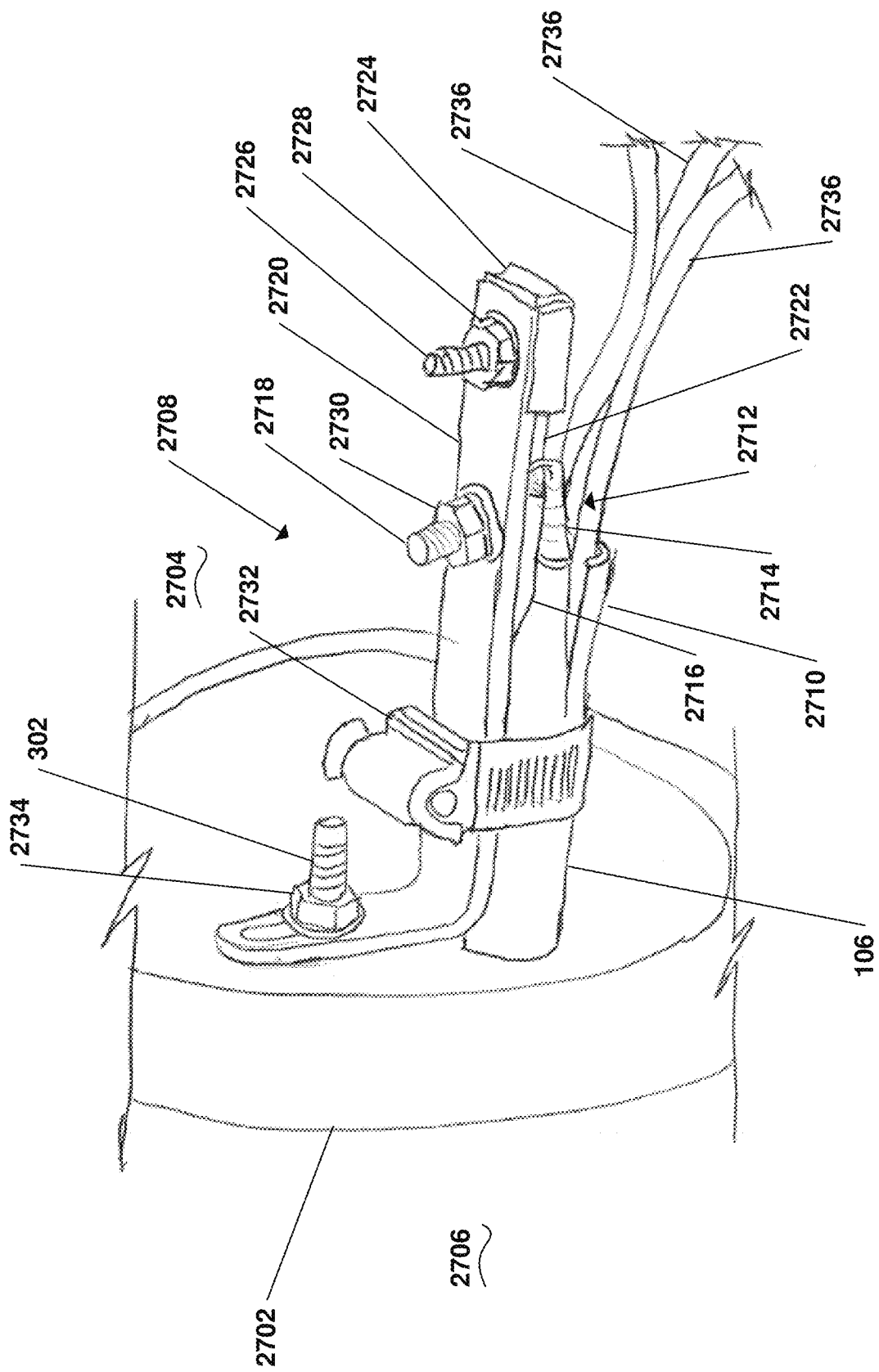
FIG. 27 is an illustration of an interior side of an example end plate for a cable enclosure.

Referring to FIG. 3, a ground stud 302 can pass from the space exterior to the cable enclosure 104 to the interior 206 of the housing 202 through the end plate 210. Each ground stud 302 can be placed in electrical communication with the previously described conductive metal sheath of an individual telecommunication cable 106 within the interior 206. Extension of the ground studs 302 through the end plate 210 enables user control of the bonding and grounding of individual sheaths within telecommunication cables 106 as desired. Additionally, the bonding and grounding of individual telecommunication cables 106 can take place entirely from the space exterior to the cable enclosure 104 without requiring removal of the end plate 210 from the cable enclosure 104. A further description of the electrical communication means between the conductive metal sheath of an individual telecommunication cable 106 and the ground studs 302 will be discussed below and an example is shown in FIG. 27.

As shown in FIG. 3, a first side 304 of the end plate 210 facing generally upward in FIG. 3 faces the exterior of the housing 202. Naturally, a second side 306 of the end plate 210 facing generally downward in FIG. 3 faces the interior 206 of the housing 202. The end plate 210 includes a first conductive leg 308 in electrical communication with a first cable (not shown) within the housing 202. In an example, the first conductive leg 308 is in electrical communication with the first cable through the ground stud 310 that passes to the interior 206. Similarly, the end plate 210 includes a second conductive leg 312 in electrical communication with a second cable (not shown) within the housing 202. The second conductive leg 312 is in electrical communication with the second cable through the ground stud 314 that passes to the interior 206.

In an example, each of the conductive legs 308, 312 can define a hole 316. As shown, the ground studs 302, 310, 314 are threaded and pass through the holes 316 of the conductive legs 308, 312 that are secured to the ground studs 302, 310, 314 using a threaded fastener (e.g., a threaded nut) that is not shown. The shown arrangement is but one example, and any suitable fastening method can be used to secure the conductive legs 308, 312 to the ground studs 302, 310, 314 to maintain a reliable electrical connection for bonding and grounding. It is to be appreciated that the conductive legs 308, 312 are electrically conductive to serve as adequate electrical connections to bond and ground the telecommunication cables 106. The conductive legs 308, 312 can be made of any suitable conductive material.

The shown example end plate 210 of FIG. 3 is configured for a cable enclosure 104 including up to seven telecommunication cables 106, and thus seven ground studs 302, 310, 314 and seven conductive legs 308, 312, however, the end plate 210 can be configured for any suitable number of telecommunication cables 106 as required by network designs.

Figure 4:
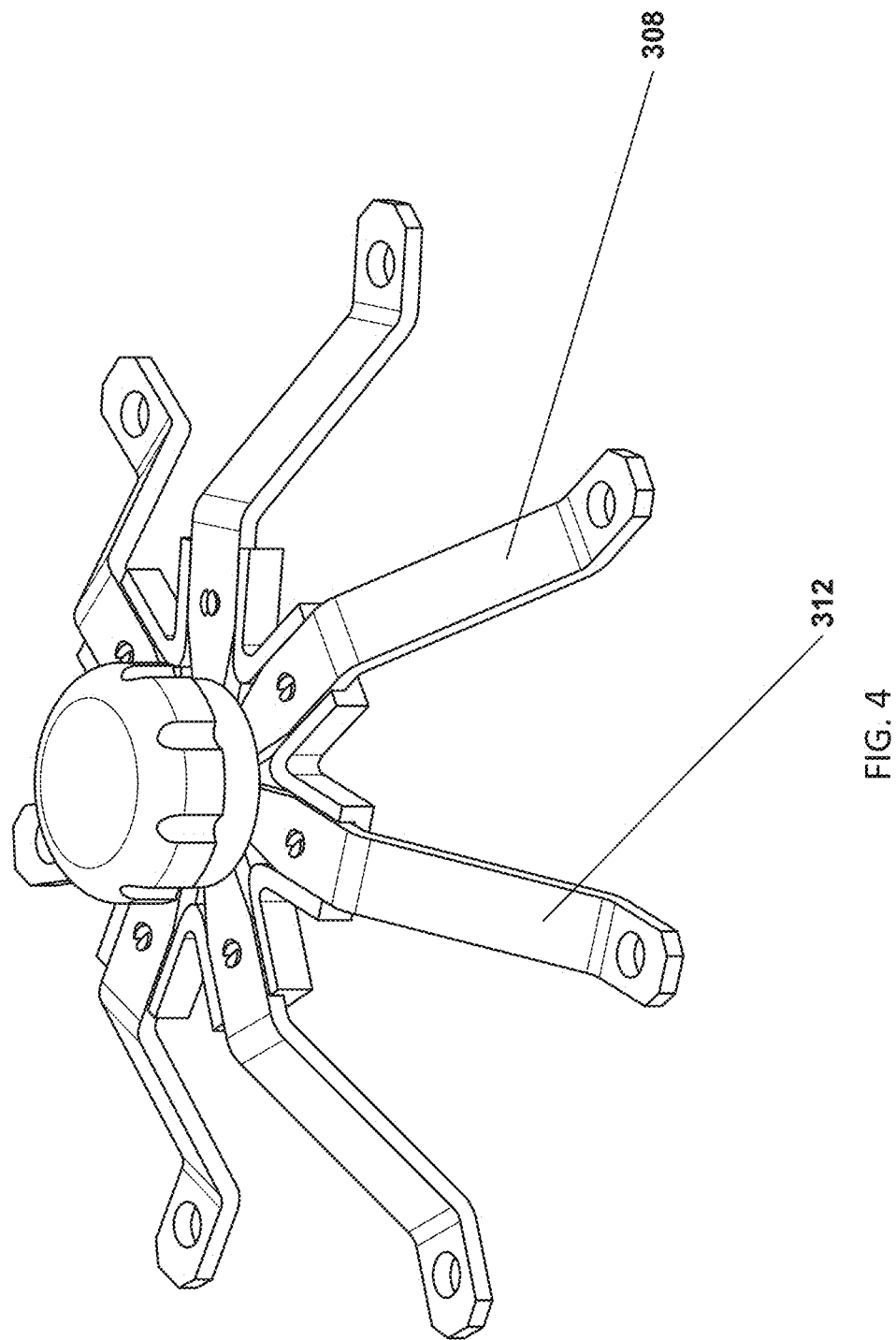
FIG. 4 is an illustration of example components for an end plate.

Referring to FIG. 4, several components of the end plate 210 are shown in a perspective view. As shown, at least one of the first conductive leg 308 or the second conductive leg 312 is not planar. With this configuration, each of the conductive legs 308, 312 can be relatively easily grasped by a user and manipulated to selectively position the conductive leg 308, 312 to place a respective telecommunication cable 106 into or out of an electrical bonding arrangement with other telecommunication cables 106 within the housing 202. In other examples, the conductive legs 308, 312 can be formed by relatively flexible materials (e.g., wires).

Figure 5:
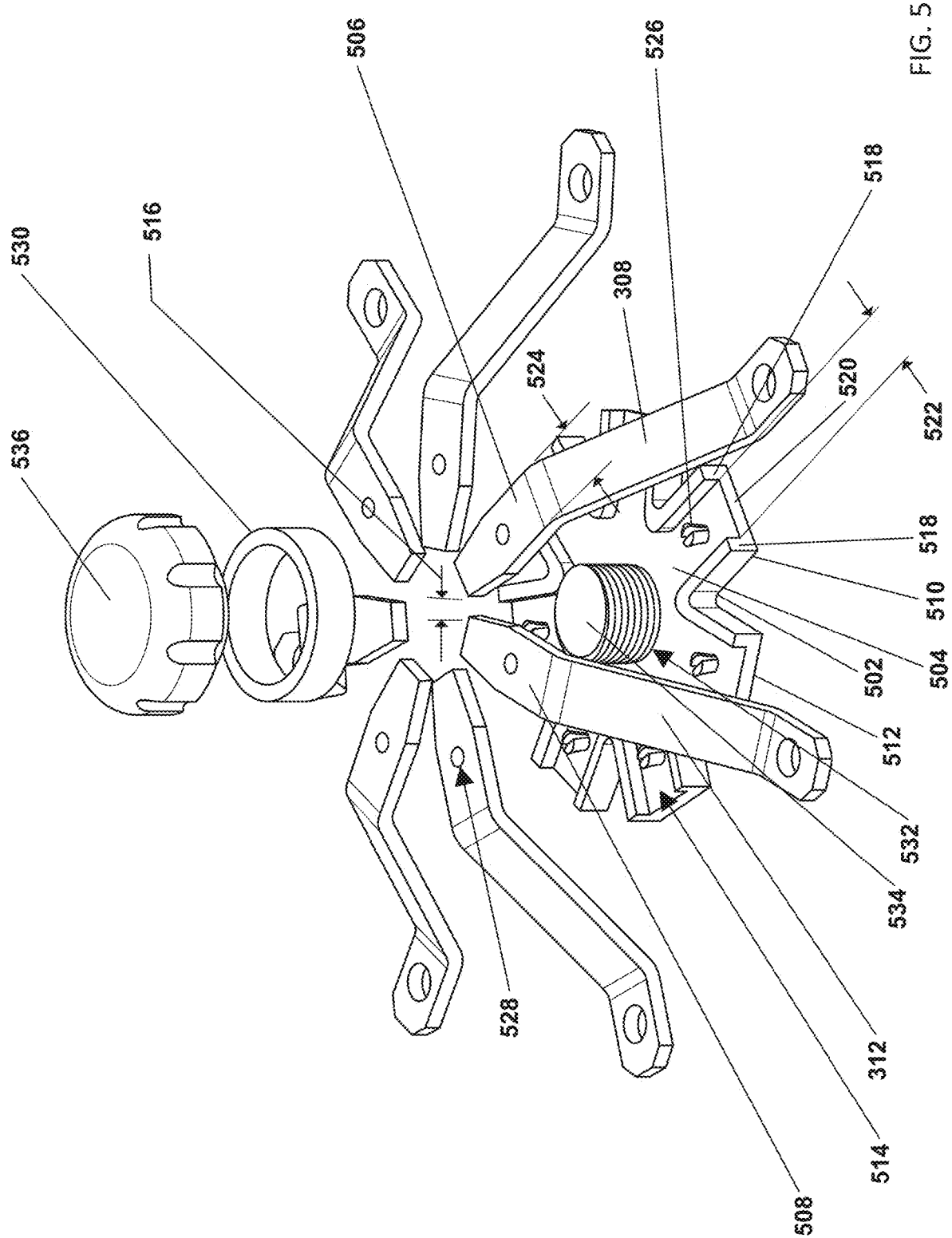
FIG. 5 is an illustration of example components for an end plate.

Referring to FIG. 5, an exploded view of several components of the end plate 210 are shown. The end plate 210 can include a nonconductive member 502 including a first portion 504 that cooperates with a portion 506 of the first conductive leg 308 and a portion 508 of the second conductive leg 312. The first portion 504 can include a first arm 510 cooperating with the portion 506 of the first conductive leg 308. The first portion 504 can also include a second arm 512 cooperating with the portion 508 of the second conductive leg 312. In an example, the first portion 504 can define a channel 514 for each conductive leg 308, 312. The channel 514 can help ensure the conductive legs 308, 312 do not come into contact with one another when contact is undesired. As such, the first conductive leg 308 and the second conductive leg 312 are separated by a distance 516 when the first arm 510 is cooperating with the portion 506 of the first conductive leg 308 and the second arm 512 is cooperating with the portion 508 of the second conductive leg 312. Separation of the conductive legs 308, 312 can help ensure that the telecommunication cables 106 are electrically bonded only when a user intends to place the telecommunication cables 106 into a bonded state.

In an example, the first arm 510 includes a feature providing a snap fit with the portion 506 of the first conductive leg 308 when the first arm 510 cooperates with the portion 506 of the first conductive leg 308. For example, the first portion 504 can define the channel 514 with a set of walls 518 and a floor 520. A distance 522 between the walls 518 (e.g., a width of the channel 514) can be equal to or slightly less than a width 524 of the portion 506 of the first conductive leg 308. In an example, the upper sections of the walls 518 are separated by the distance 522 and the lower sections of the walls 518 are separated by a distance equal to or greater than width 524 of the portion 506. As such, when a user places the first conductive leg 308 into cooperation with the first portion 504 of the nonconductive member 502, the walls 518 will elastically deform until the portion 506 passes into the lower section of the channel 514 when the walls will snap back into place. A snap fit feature can help ensure that each conductive leg 308, 312 maintains an intended position relative to other components and can also provide the user sensory feedback to signal proper assembly and cooperation of the first conductive leg 308 to the first arm 510 of the nonconductive member 502.

Remaining with FIG. 5, as one example alternative snap fit feature, the first arm 510 can include a tab 526 that cooperates with an aperture 528 defined by the first conductive leg 308. The tab 526 can define a gap between two halves of the tab 526. The aperture 528 has a diameter less than the diameter of the tab 526 such that the aperture 528 urges the two halves of the tab 526 toward each other as the tab 526 passes through the aperture 528. After a length of the two halves of the tab 526 pass through the aperture 528, the two halves can snap back to their original configuration to help maintain the intended position of the conductive legs 308, 312 relative to other components and also give the user sensory feedback to signal proper assembly and cooperation of the first conductive leg 308 to the first arm 510 of the nonconductive member 502.

The end plate 210 includes a conductive member 530 that can selectively contact all of the conductive legs 308, 312. Contact between the conductive member 530 and all of the conductive legs 308, 312 provides an electrical pathway between the sheaths of each telecommunication cable 106 through the ground stud 302, the conductive leg 308, and then through the conductive member 530 to every other sheath of the telecommunication cables 106 within the cable enclosure 104. This connection bonds the telecommunication cables 106 such that the sheath of each telecommunication cable 106 has the same electrical potential as each of the other sheaths.

In order to promote the selective contact between the conductive member 530 and all of the conductive legs 308, 312, the conductive member 530 is movable between a first position and a second position. When in the first position, the conductive member 530 is in contact with the first conductive leg 308 and the second conductive leg 312 as shown in FIG. 3. In FIG. 3, the conductive member 530 is in contact with all of the conductive legs 308, 312 such that each of the sheaths of the telecommunication cables 106 are electrically bonded. As shown, the conductive member 530 can be toroidal in shape, although this is just one example, and any suitable shape can be used.

Remaining with FIG. 5, nonconductive member 502 can also include a second portion 532 that cooperates with the conductive member 530. In an example, the second portion 532 can be a central, threaded column 534. The conductive member 530 can include a cap 536 that cooperates with the second portion 532 of the nonconductive member 502. In the shown example, the cap 536 includes female threads that cooperate (e.g., threadingly engage) with the male threads of the threaded column 534. Thus, as the cap 536 is rotated in a clockwise direction (in right-hand threaded examples), the conductive member 530 translates in a direction parallel to the central axis 208 when the conductive member 530 is moved between the first position (as shown in FIG. 3) and the second position. As such, a user can, without removing the end plate 210, urge the conductive member 530 from the first position to the second position and back to the first position. Effectively, the conductive member 530 moves from the first position where the conductive member 530 contacts all of the conductive legs 308, 312 to electrically bond all of the telecommunication cables 106 together to the second position where the conductive member 530 does not contact any of the conductive legs 308, 312, thereby removing the electrically bonded connection.

Figure 6:
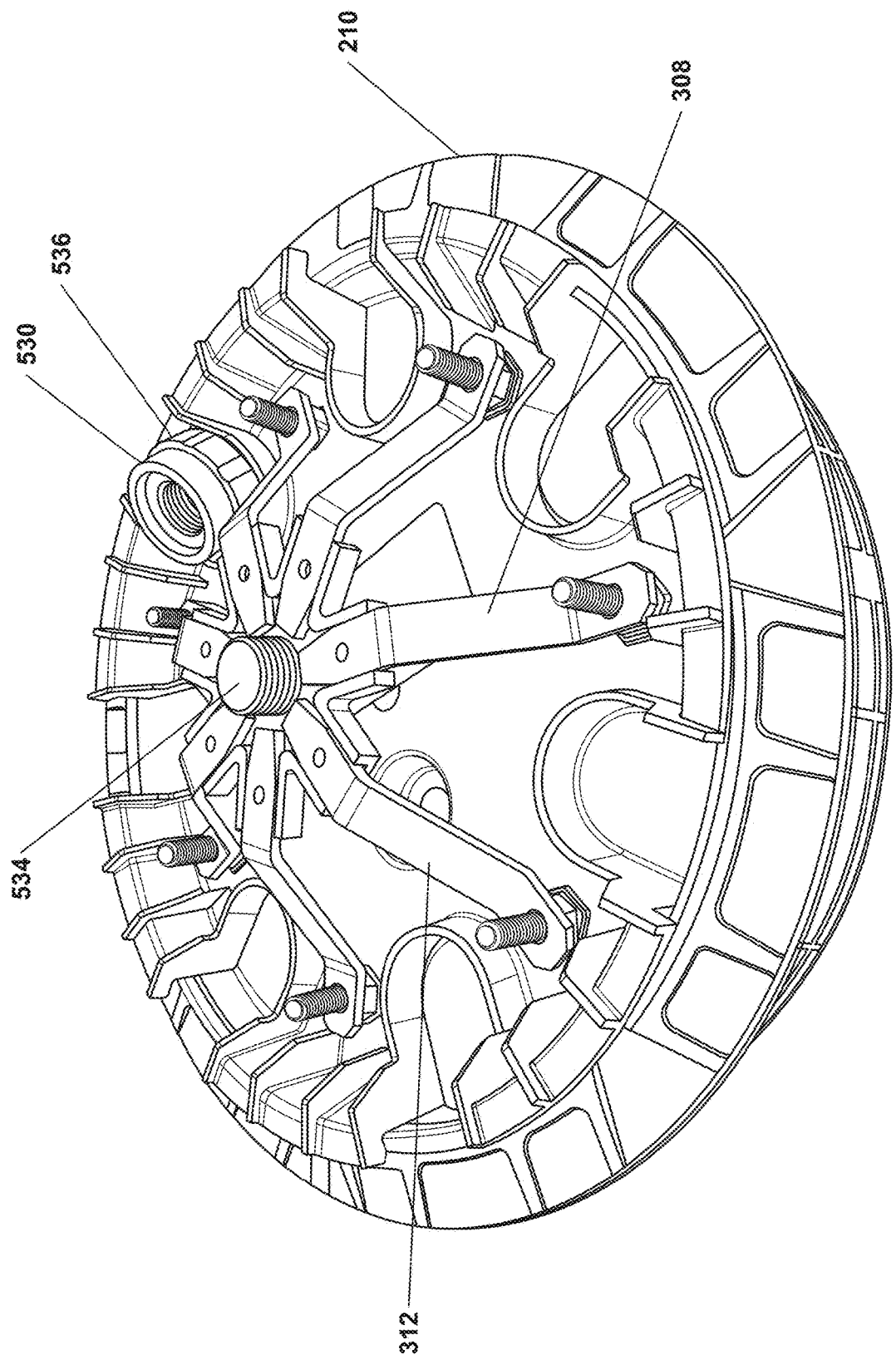
FIG. 6 is an illustration of an example end plate for a cable enclosure.

Referring to FIG. 6, when in the second position, the conductive member 530 is not in contact with at least one of the first conductive leg 308 or the second conductive leg 312. In FIG. 6, the conductive member 530 is not in contact with any of the conductive legs 308, 312 such that no one sheath of any telecommunication cable 106 within the cable enclosure 104 is bonded to any other sheath of the remaining telecommunication cables 106 within the cable enclosure 104.

While FIG. 6 shows the conductive member 530 completely removed from the threaded column 534, it is to be understood that the conductive member 530 does not have to be fully removed from the threaded column 534 to be placed in the second position. There are a range of second position locations to which the conductive member can be moved by using the threaded connection between the cap 536 and the threaded column 534, each of the second positions eliminating the connection between the conductive member 530 and the conductive legs 308, 312.

Figure 7:
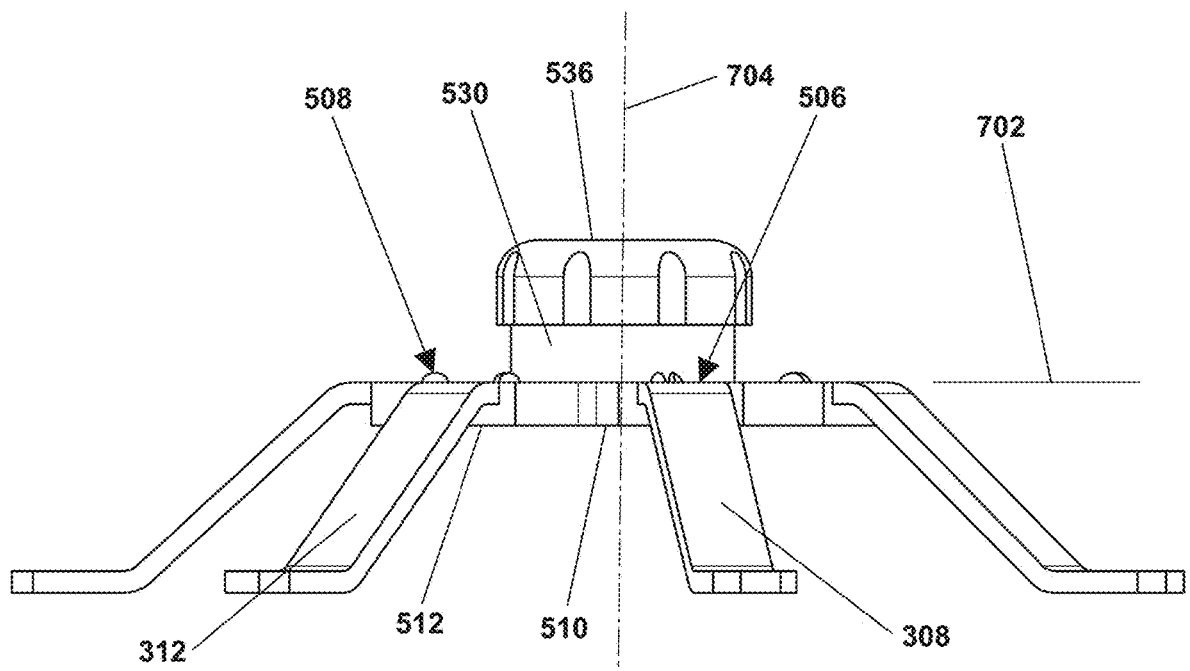
FIG. 7 is an illustration of example components for an end plate.

Referring to FIG. 7, the portion 506 of the first conductive leg 308 lies within a plane (as defined by line 702, the plane extending into and out of the page of FIG. 7) when the first conductive leg 308 is cooperating with the first arm 510. Similarly, the portion 508 of the second conductive leg 312 lies within the plane 702 when the second conductive leg 312 is cooperating with the second arm 512. As such, the conductive member 530 concurrently contacts the first conductive leg 308 and the second conductive leg 312 when the conductive member 530 is moved from the second position to the first position. In an example, the plane 702 can be perpendicular to an axis 704. In an example, the axis 704 is parallel to the central axis 208 (shown in FIG. 2). In an example, the axis 704 is colinear with the central axis 208.

In an example, the conductive member 530 concurrently contacts all of the conductive legs 308, 312 when the conductive member 530 is moved from the second position to the first position. As such, in an example, the conductive member 530 can be used to effectively create an electrical bond between all of the telecommunication cables 106 or none of the telecommunication cables 106 within the cable enclosure 104. In other words, the electrical bond can be in place or not in place for all of the telecommunication cables 106 at once, not piecemeal or creating bonding between only a fraction of the telecommunication cables 106.

In an example, the conductive member 530 is attached to the cap 536 and rotates about the axis 704 parallel to the central axis 208 when the conductive member 530 is moved between the first position and the second position.

Figure 8:
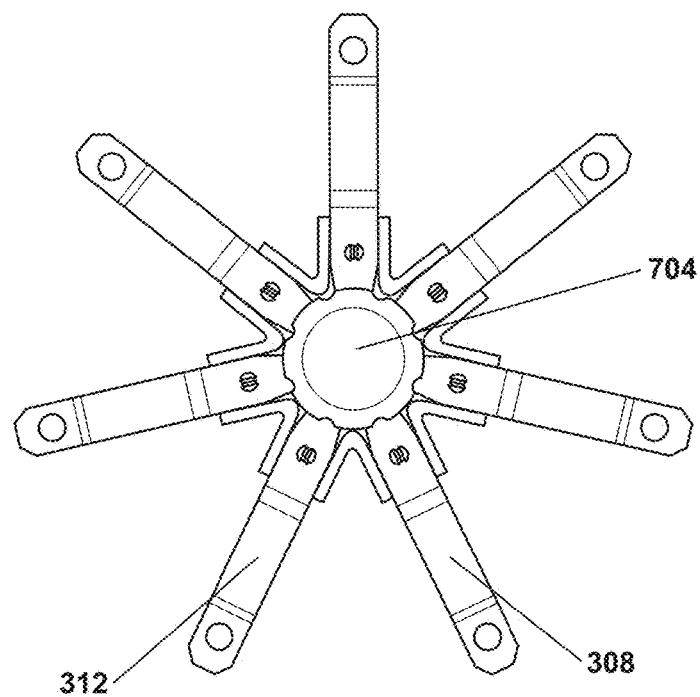
FIG. 8 is an illustration of example components for an end plate.

Referring to FIG. 8, the conductive legs 308, 312 can be arranged in a radial pattern relative to axis 704 (represented by a dot in FIG. 8). The radial pattern arrangement can be beneficial in order to create a centralized connection point for the conductive member 530 from the ground studs 302 (shown in FIG. 3) which can be located about the perimeter of the end plate 210. This radial pattern can also be beneficial to ease location and manipulation of individual conductive legs 308, 312 as will be described below.

Figure 9:
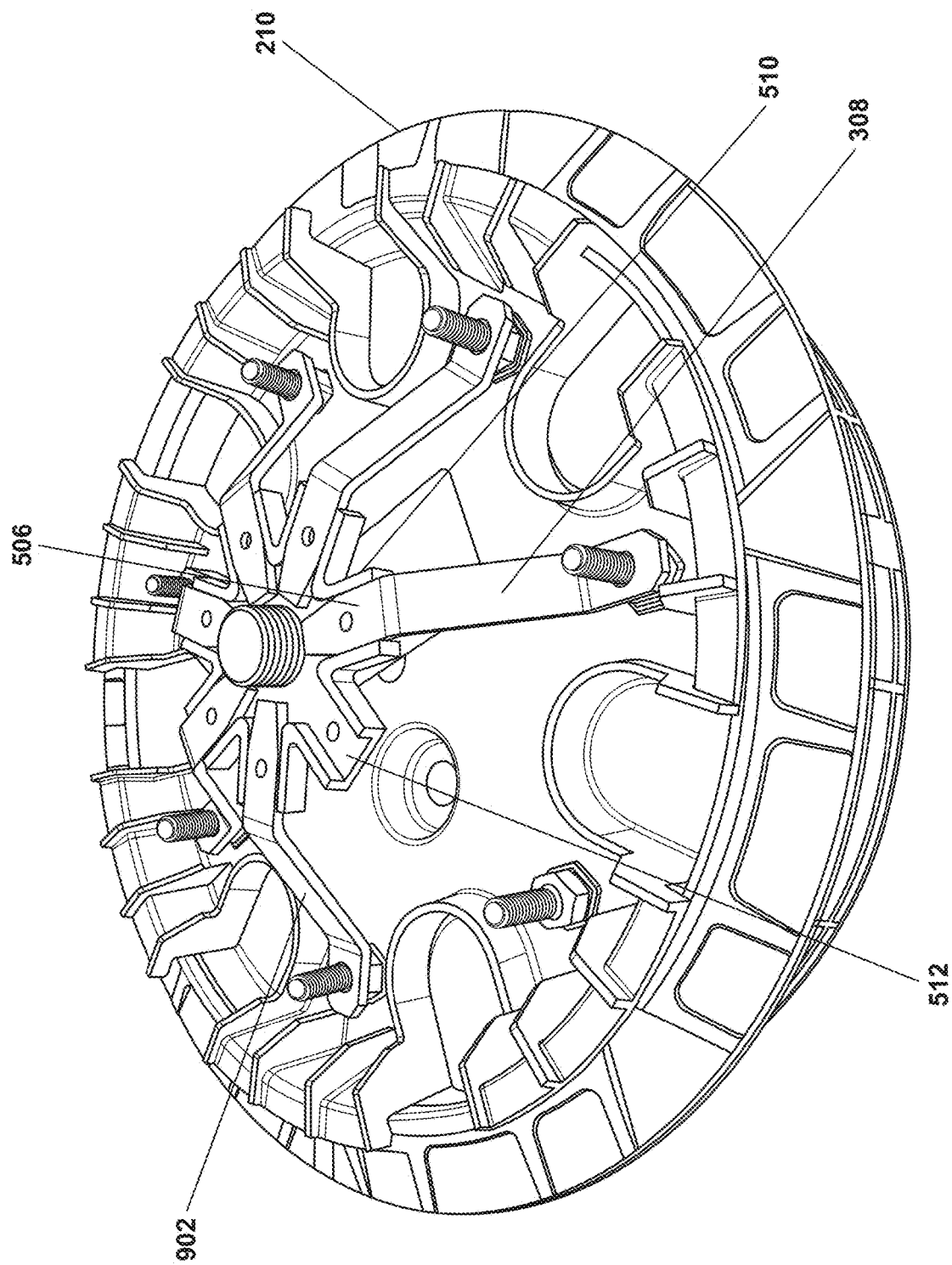
FIG. 9 is an illustration of an example end plate for a cable enclosure.

Referring to FIG. 9, the end plate 210 can include a third conductive leg 902 that is in electrical communication with a third cable (not shown) within the housing 202. When the conductive member 530 is in the first position as shown in FIGS. 3 and 4, the conductive member 530 is in contact with the third conductive leg 902 such that the third conductive leg 902 is in electrical communication with the first conductive leg 308 and the second conductive leg 312 through the conductive member 530. When the conductive member 530 is in the second position as shown in FIGS. 6 and 9, the second conductive leg 312 is removable from the end plate 210. FIG. 9 shows the second conductive leg 312 removed from the end plate 210, thereby creating an empty space between the first conductive leg 308 and the third conductive leg 902. As such, cooperation of the first arm 510 with the portion 506 of the first conductive leg 308 is independent of cooperation of the second arm 512 with the portion 508 of the second conductive leg 312. It is to be appreciated that the independent cooperation of any of the conductive legs 308, 312, 902 can be said for each of the conductive legs 308, 312, 902 within the housing 202 such that any one of the telecommunication cables 106 within the housing 202 can be removed from an electrical bonding connection with the rest of the telecommunication cables 106 within the housing 202.

As has been noted previously, there can be benefits to removing a conductive leg 308, 312, 902 from the end plate 210, thus removing a telecommunication cable 106 from a common electrical bond with the remaining telecommunication cables 106 within the housing 202. For example, in the case of buried telecommunication cables 106, a utility worker can use a tool to send electrical pulses through the metal sheath in a single, unbonded telecommunication cable 106 in order to aid location efforts of the damaged telecommunication cable 106.

Figure 10:
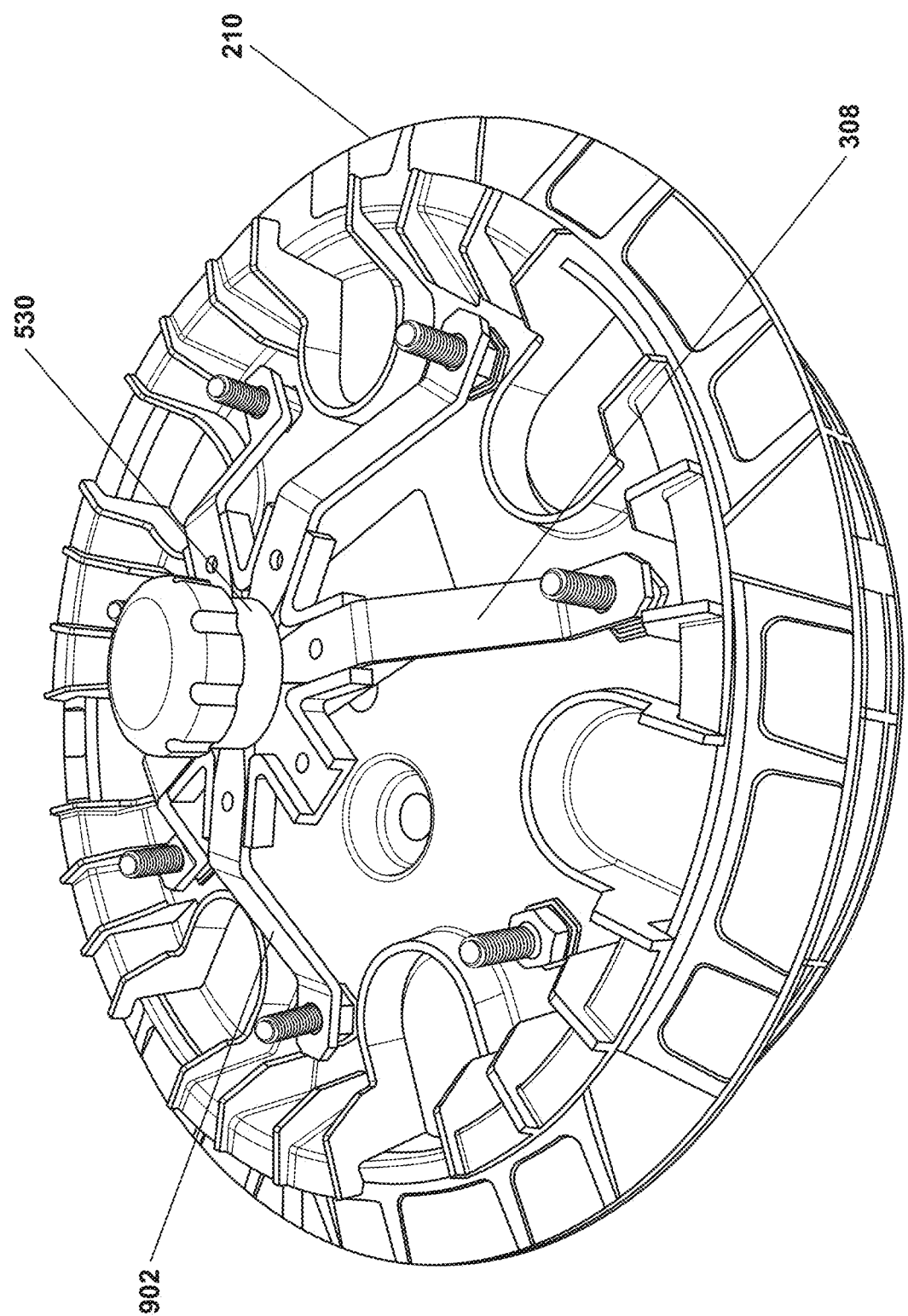
FIG. 10 is an illustration of an example end plate for a cable enclosure.

Referring to FIG. 10, the end plate 210 is shown with the second conductive leg 312 removed, as in FIG. 9, and the conductive member 530 is returned to the first position. When the second conductive leg 312 is removed from the end plate 210 and the conductive member 530 is in the first position, the conductive member 530 is in contact with the first conductive leg 308 and the third conductive leg 902 such that the first conductive leg 308 is in electrical communication with the third conductive leg 902 through the conductive member 530. However, the first conductive leg 308 is not in electrical communication with the second conductive leg 312. In an example, when the second conductive leg 312 is removed from the end plate 210 and the conductive member 530 is in the first position, the conductive member 530 is in contact and electrical communication with all of the other conductive legs 308, 902 of the end plate 210 through the conductive member 530 except the second conductive leg 312.

As shown in FIG. 10, the second conductive leg 312, and thus the second telecommunication cable 106 can be removed from electrical communication (e.g., removed from being bonded) with all of the other telecommunication cables 106 within the housing 202. As noted previously, there can be benefits to removing a single telecommunication cable 106 from the bonded connection with the other telecommunication cables 106. At times, it can be beneficial to place the remaining telecommunication cables 106 into electrical communication (e.g., bonded with each other) while a procedure is completed on the telecommunication cable 106 that is not bonded with the remaining telecommunication cables 106. As such, the conductive member 530 can be moved back to the first position as shown in FIG. 10 to electrically bond the remaining telecommunication cables 106. While the example in FIG. 10 represents removal of one telecommunication cable 106 from electrical bonding, it is to be understood that multiple conductive legs 308, 312, 902 can be removed to remove as many telecommunication cables 106 from the bonding arrangement as desired.

At the completion of the desired procedure (e.g., locating a severed telecommunication cable 106 that is not bonded with the remainder of the telecommunication cables 106), a utility worker can return the unbonded telecommunication cable 106 back to a bonded arrangement with the remaining telecommunication cables 106 by reversing the steps to remove one telecommunication cable 106 from the bonded arrangement. In an example, the conductive member 530 can be moved to the second position as shown in FIG. 9. Then, the second conductive leg 312 is returned to a position of cooperation of the second arm 512 with the portion 508 of the second conductive leg 312 as shown in FIG. 6. Finally, the conductive member 530 can be moved back to the first position as shown in FIGS. 3 and 4 to effectively electrically bond all of the telecommunication cables 106 within the housing to each other.

It is worthy of note that the conductive legs 308, 312, 902 are relatively easily taken out of and placed back into cooperation with the arms 510, 512 of the nonconductive member 502 in order to selectively bond and unbond individual telecommunication cables 106 as desired. Furthermore, this procedure is repeatable, whereas some devices require permanent deformation or removal of electrical connections to remove a single telecommunication cable from a bonding arrangement.

In an example, the end plate 210 is releasably secured to the housing 202 between a first orientation relative to the housing 202 and a second orientation relative to the housing 202. In the first orientation, the end plate 210 does not cover the opening 204 such that the interior of the housing 202 is accessible from an exterior space. In the second orientation, the end plate 210 covers the opening 204 such that the interior 206 of the housing 202 is not accessible. In this and other examples, the conductive member 530 is movable between the first position and the second position when the end plate 210 is in the second orientation relative to the housing 202. In other words, a utility worker can relatively easily electrically bond the telecommunication cables 106 to each other and relatively easily remove one or more of the telecommunication cables 106 from being electrically bonded to each other without placing the end plate 210 into the first orientation to open the housing 202. Likewise, the housing 202 does not need to be taken apart if it is a multiple-piece housing structure for the bonding and unbonding operation.

Figure 11:
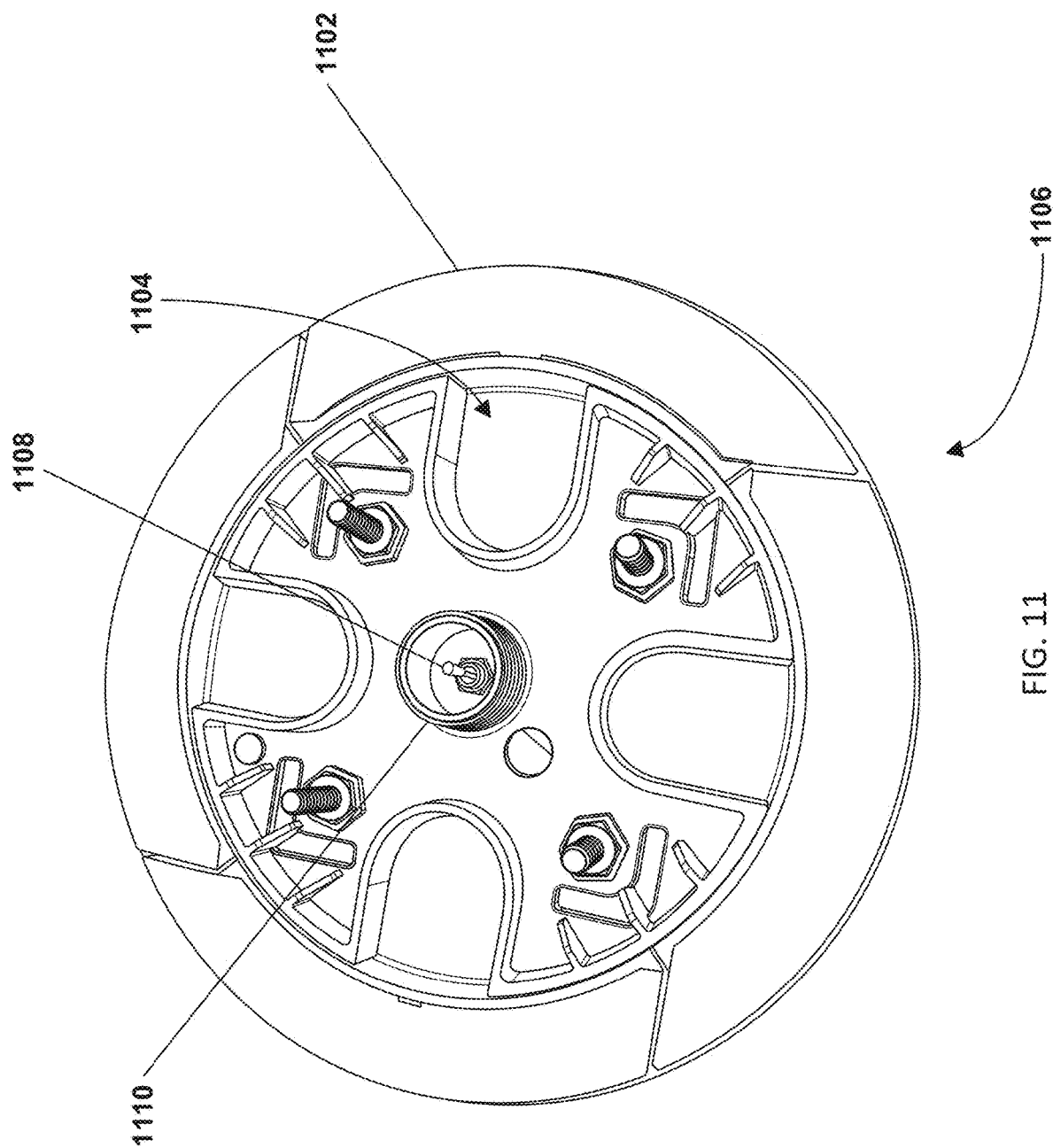
FIG. 11 is an illustration of an example end plate for a cable enclosure.

Referring to FIG. 11, an example end plate 1102 includes a first side 1104 facing an exterior of the housing 202 (shown in FIG. 2). A second side 1106 (shown in FIG. 14) faces the interior 206 of the housing 202. In an example, a switch 1108 is attached to the first side 1104 of the end plate 1102. The end plate 1102 of FIG. 11 is configured for a cable enclosure 104 having four telecommunication cables 106 within the housing 202, however, any suitable number of telecommunication cables 106 is also contemplated.

Figure 12:
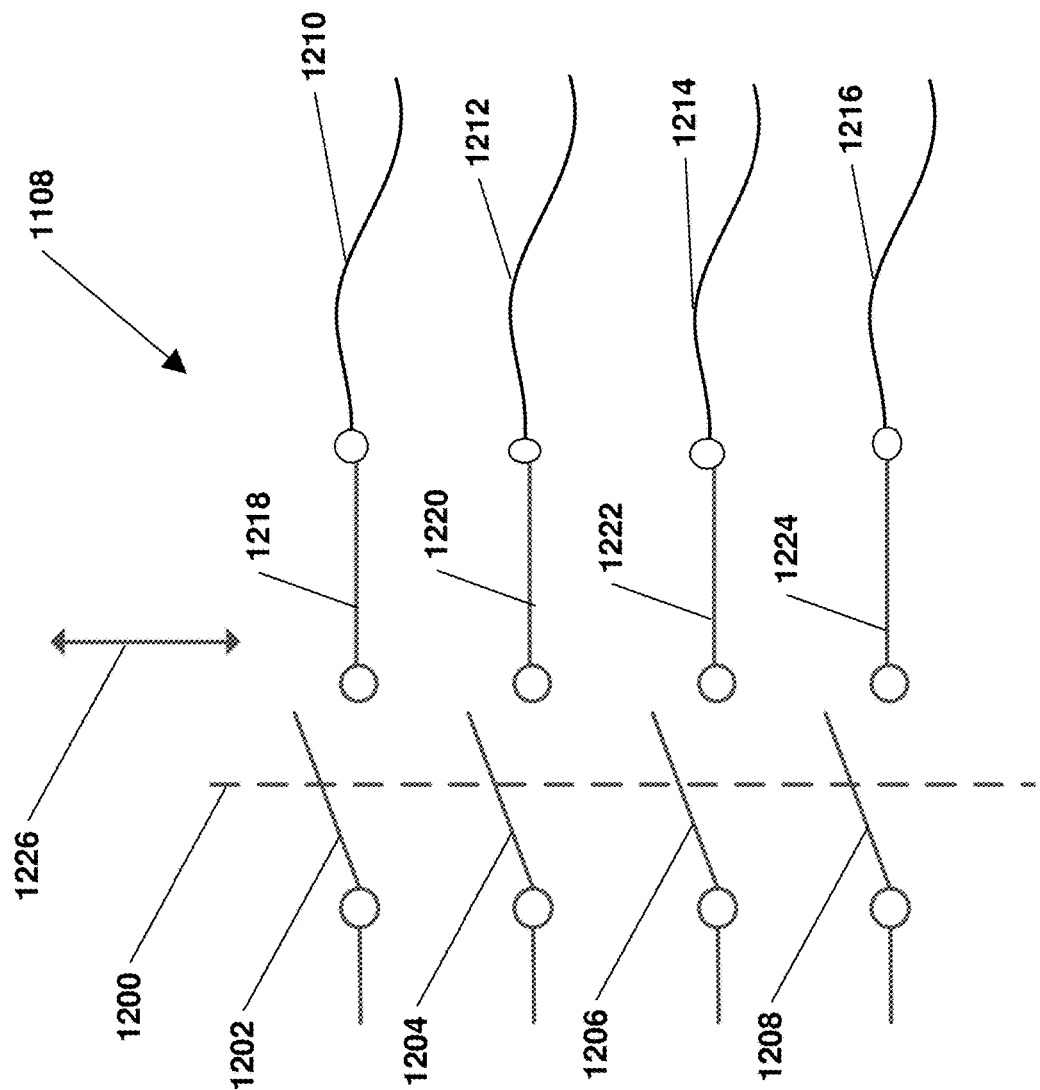
FIG. 12 is an illustration of an example switch for an end plate.

Referring to FIG. 12, a line diagram of the switch 1108 is shown. The switch 1108 includes a conductive member 1200 that can be moved from a first position to a second position. The switch 1108 can include a first cable pin 1202, a second cable pin 1204, a third cable pin 1206, and a fourth cable pin

1208. The first cable pin 1202 is in electrical communication with an electrically conductive sheath of a first telecommunication cable 1210. Similarly, the second cable pin 1204 is in electrical communication with an electrically conductive sheath of a second telecommunication cable 1212, the third cable pin 1206 is in electrical communication with an electrically conductive sheath of a third telecommunication cable 1214, and the fourth cable pin 1208 is in electrical communication with an electrically conductive sheath of a fourth telecommunication cable 1216.

The conductive member 1200 is moved by a portion of the switch 1108 (e.g., a lever, a toggle handle, etc.). In an example, the switch 1108 can be a toggle switch, and movement of the switch handle from one position to another position can move the conductive member 1200 from a first position in which the first cable pin 1202 is in electrical communication with a first conductive leg 1218. Additionally, when the conductive member 1200 is in the first position, the second cable pin 1204 is in electrical communication with a second conductive leg 1220. In an example, when the conductive member 1200 is in the first position, all of the cable pins 1202, 1204, 1206, 1208 are in electrical communication with their respective conductive legs, the first conductive leg 1218, the second conductive leg 1220, a third conductive leg 1222 and a fourth conductive leg 1224. Each of the cable pins 1202, 1204, 1206, 1208 are connected to the conductive member 1200 to electrically bond each of the telecommunication cables 1210, 1212, 1214, 1216 to each other.

In the example of FIG. 12, the conductive member 1200 is in the second position such that the first cable pin 1202 is not in electrical communication with the first conductive leg 1218. Additionally, the second cable pin 1204 is not in electrical communication with the second conductive leg 1220. In an example, when the conductive member 1200 is in the second position, the third cable pin 1206 is not in electrical communication with the third conductive leg 1222 and the fourth cable pin is not in electrical communication with the fourth conductive leg 1224. Simply put, when the conductive member 1200 is in the second position, all of the conductive legs 1218, 1220, 1222, 1224 are not in electrical communication with the conductive member 1200 such that the telecommunication cables 1210, 1212, 1214, 1216 are not electrically bonded to each other.

In an example, the switch 1108 is a two-position switch that moves the conductive member 1200 from a first position that electrically bonds all of the telecommunication cables 1210, 1212, 1214, 1216 to each other to a second position such that all of the telecommunication cables 1210, 1212, 1214, 1216 are not bonded to each other. Movement of the conductive member 1200 from the first position to the second position can generally follow the direction of arrow 1226.

Similar to the previous example, the switch 1108 can be operated externally to the cable enclosure 104. External operation of the switch 1108 can be beneficial to eliminate the need for a utility worker to open the housing 202, remove the electrical bonding connection for at least one telecommunication cable, conduct a desired operation, and then bond the telecommunication cables together again, and re-close the housing 202. In an example, a seal can be placed between the switch 1108 and the end plate 1102 to help reduce or eliminate dust, dirt, moisture, etc. penetration into the housing 202.

Figure 13:
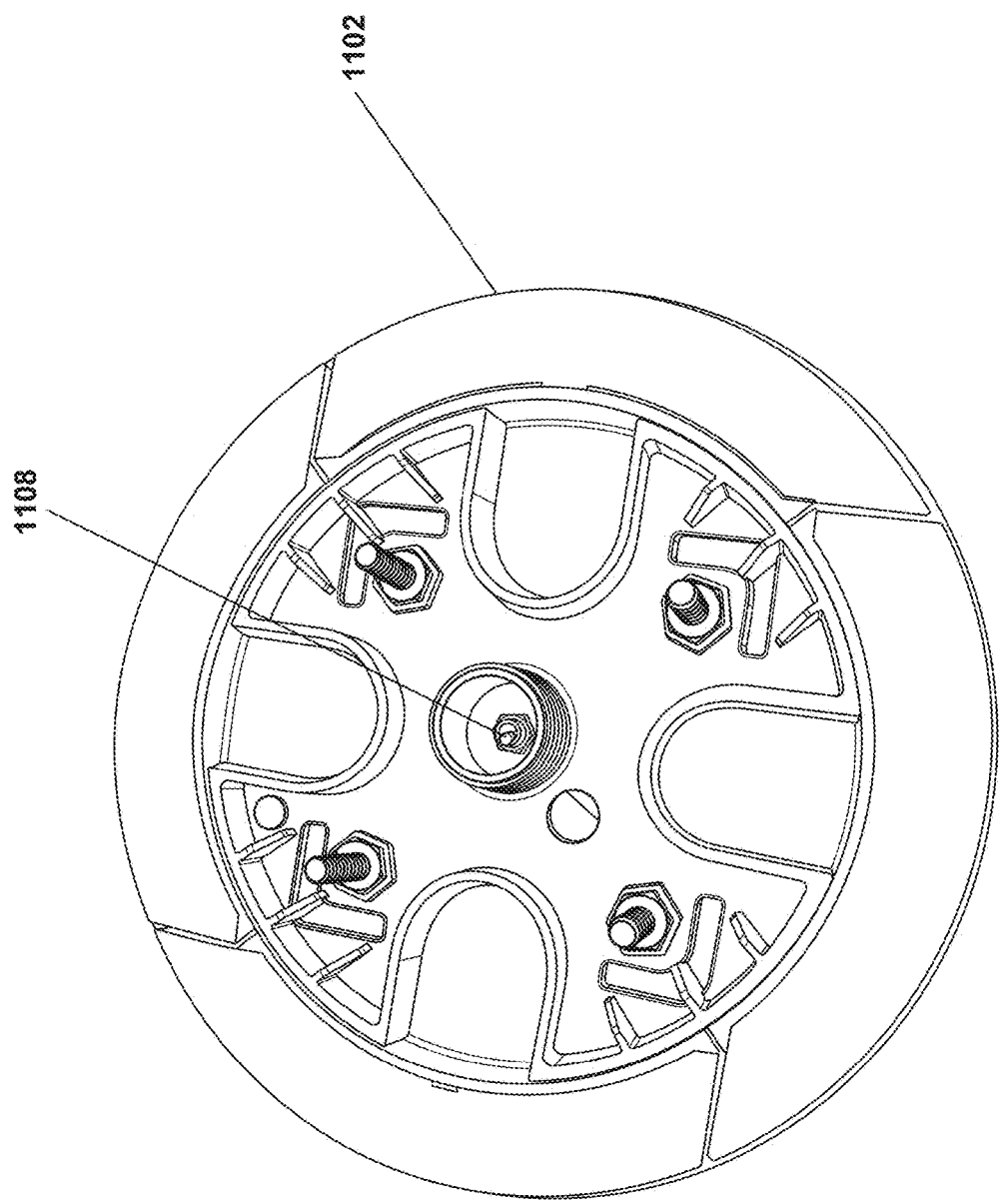
FIG. 13 is an illustration of an example end plate for a cable enclosure.

Referring to FIG. 13, the switch 1108 is shown in a second position which places the conductive member 1200 (shown in FIG. 12) in the second position. The switch 1108 can be relatively easily moved from the second position to the first position as shown in FIG. 11 to establish and disestablish electrical bonding between the telecommunication cables telecommunication cables 1210, 1212, 1214, 1216. This can be done while the end plate 1102 is in the second orientation relative to the housing 202.

Figure 14:
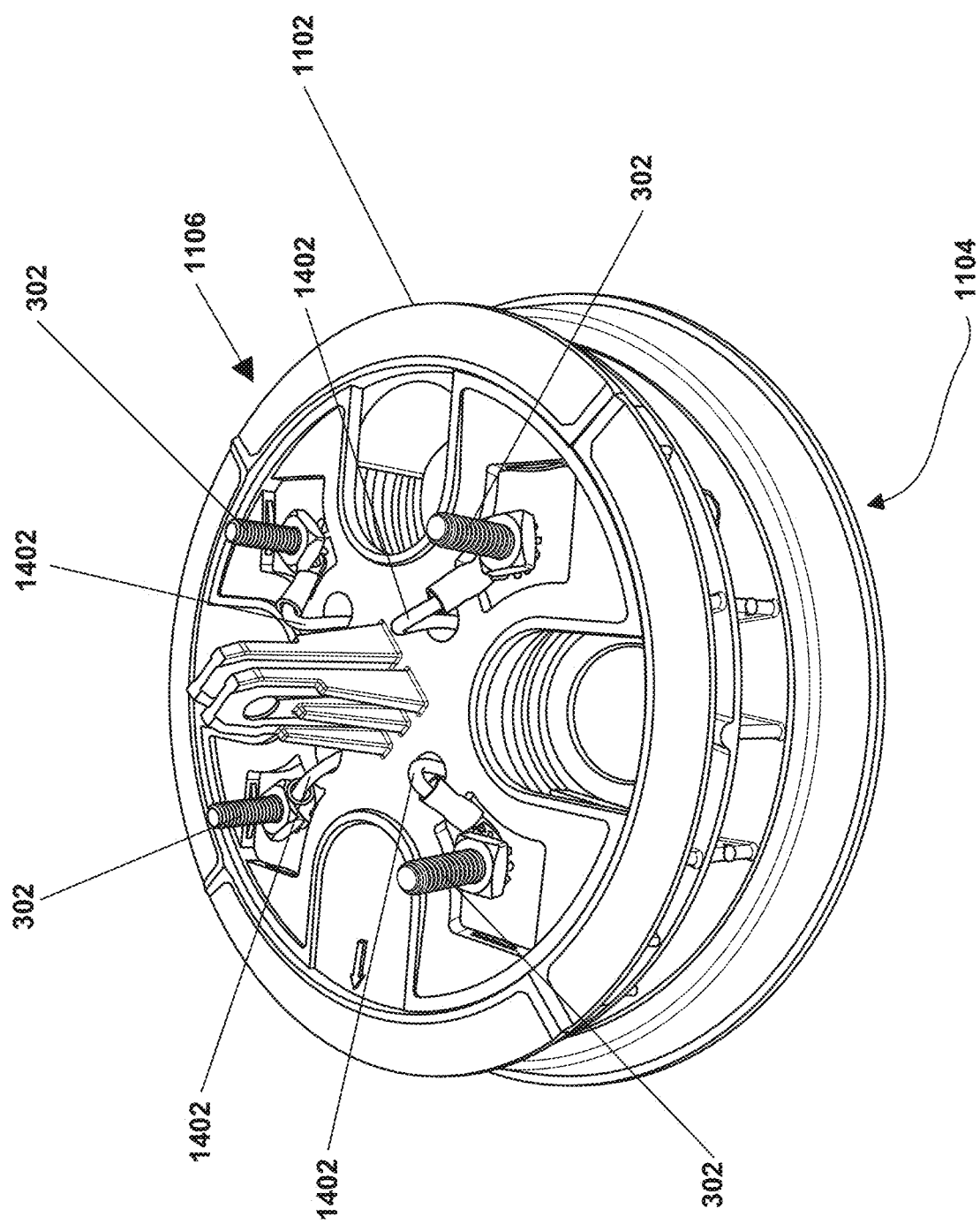
FIG. 14 is an illustration of an example end plate for a cable enclosure.

Referring to FIG. 14, the second side 1106 of the end plate 1102 is shown. The end plate 1102 can include an electrical conductor 1402 (e.g. a wire) establishing an electrical connection between each conductive leg 1218, 1220, 1222, 1224 and the ground studs 302. At assembly of the cable enclosure 104, each ground stud 302 can be in electrical communication with one telecommunication cable 1210, 1212, 1214, 1216.

Figure 15:
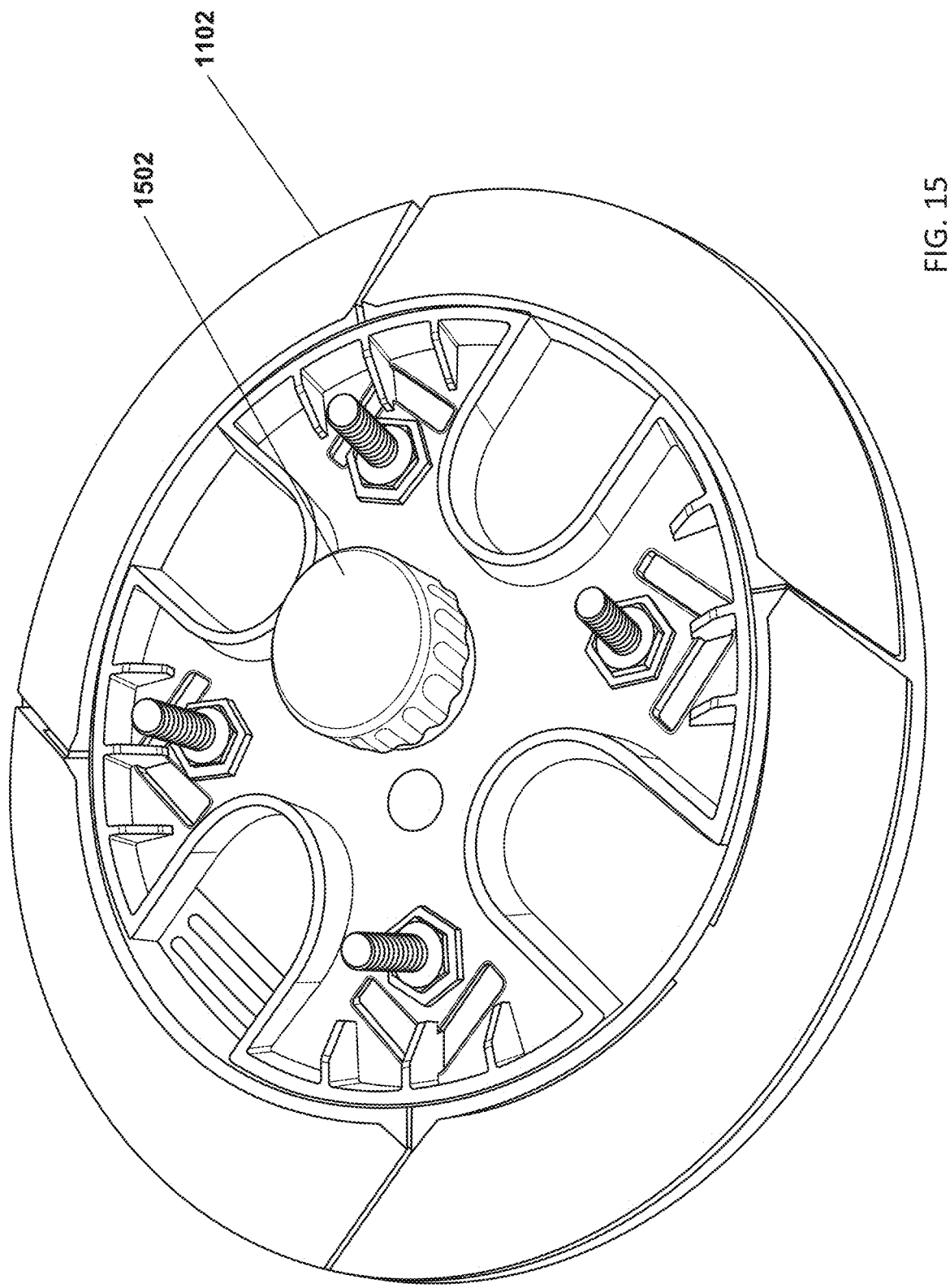
FIG. 15 is an illustration of an example end plate for a cable enclosure.

Referring to FIG. 15, the end plate 1102 can include a cap 1502 that can cooperate with a portion of the end plate 1102 to protect the switch 1108 from the elements and accidental operation. In an example, an inside diameter of the cap 1502 can be threaded to engage with a threaded column 1110 (shown in FIG. 11). Any suitable methods and structure facilitating mounting the cap 1502 to the end plate 1102 are contemplated.

Figure 16:
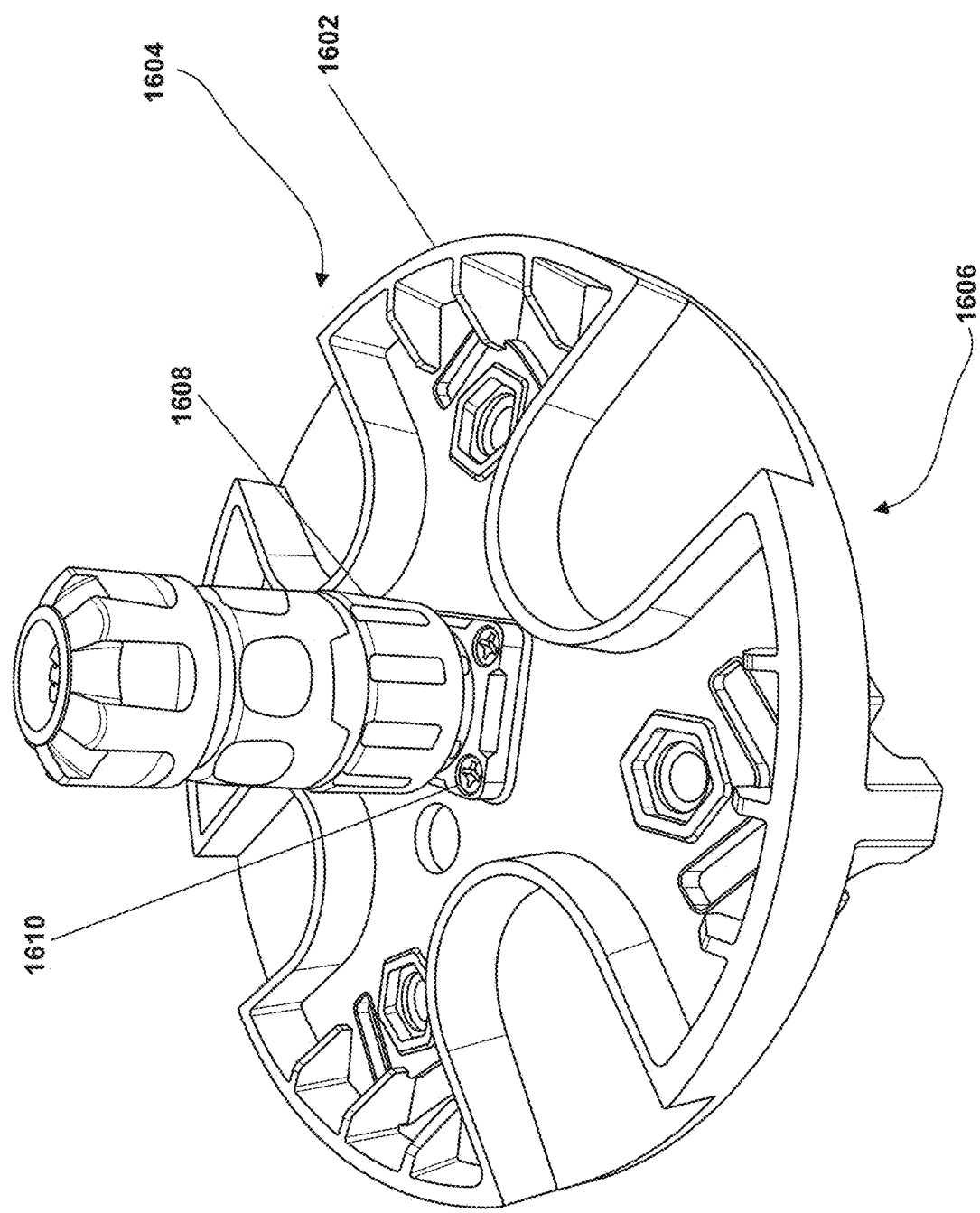
FIG. 16 is an illustration of an example end plate for a cable enclosure.

Referring to FIG. 16, an example end plate 1602 is shown. The end plate 1602 includes a first side 1604 facing an exterior of the housing 202 (shown in FIG. 2). The end plate 1602 also includes a second side 1606 (shown in FIG. 18) facing the interior of the housing 202. The end plate 1602 includes a conductive member 1608 that is a plug removably attached to the first side 1604 of the end plate 1602. The conductive member 1608 is shown in a first position in FIG. 16 where it is engaged with a receiving member 1610 mounted to the end plate 1602. Any suitable connection structure between the conductive member 1608 and the receiving member 1610 can be used.

Figure 17:
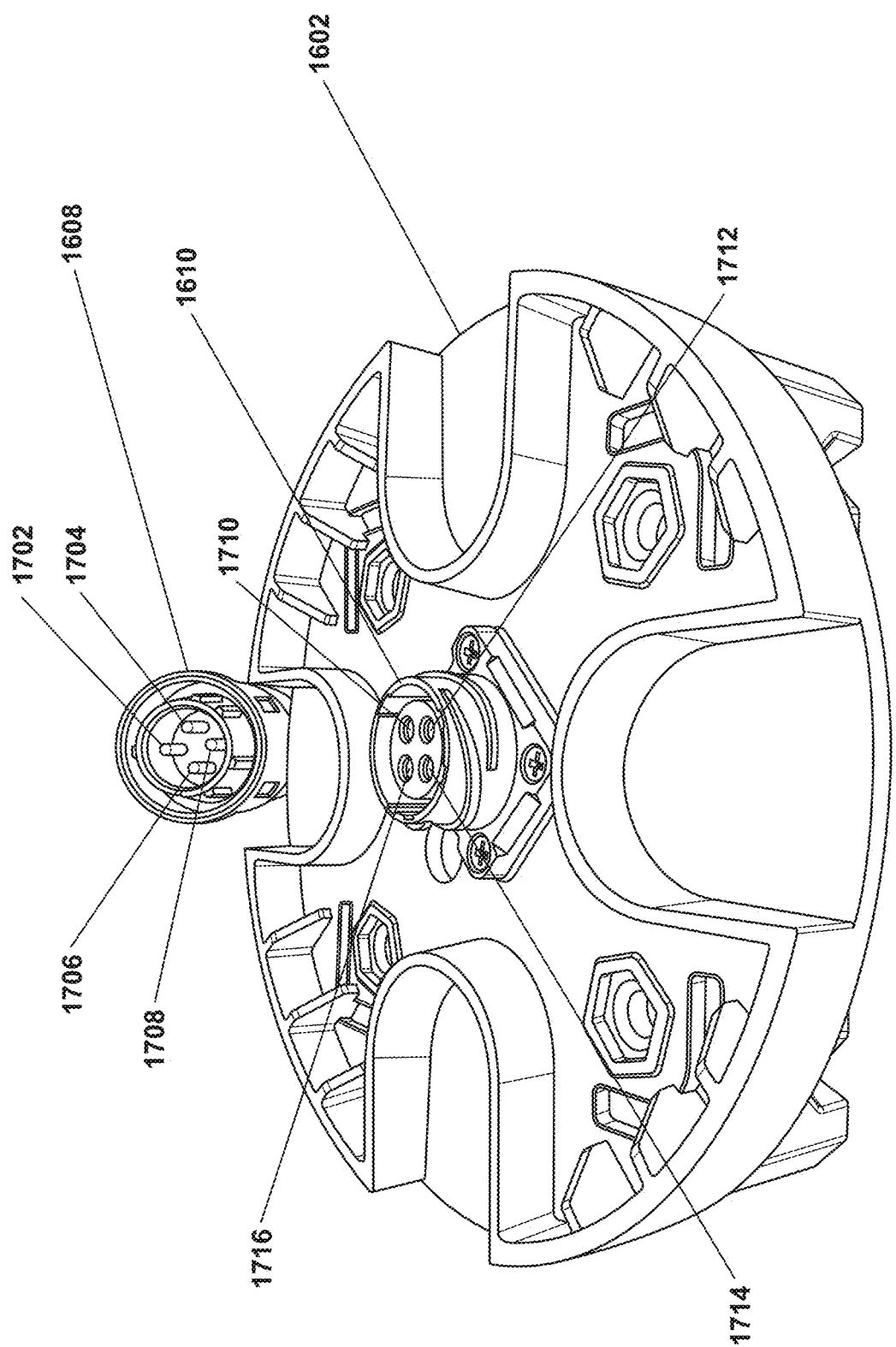
FIG. 17 is an illustration of an example end plate for a cable enclosure.

Referring to FIG. 17, the conductive member 1608 is shown in a second position. The conductive member 1608 (e.g., the plug), includes a first connector 1702 and a second connector 1704. The conductive member 1608 can further include a third connector 1706 and a fourth connector 1708. As with the previous examples, the conductive member 1608 can be moved from the first position to the second position. When the conductive member 1608 is in the first position, the first connector 1702 is in electrical communication with a first conductive leg 1710 located in the receiving member 1610. Similarly, when the conductive member 1608 is in the first position, the second connector 1704 is in electrical communication with a second conductive leg 1712. The third connector 1706 and the fourth connector 1708 are in electrical communication with a third conductive leg 1714 and a fourth conductive leg 1716, respectively. The shown end plate 1602 is configured for use with a cable enclosure 104 having four telecommunication cables 106 within the housing 202, however, any suitable number of telecommunication cables 106 is also contemplated.

Figure 18:
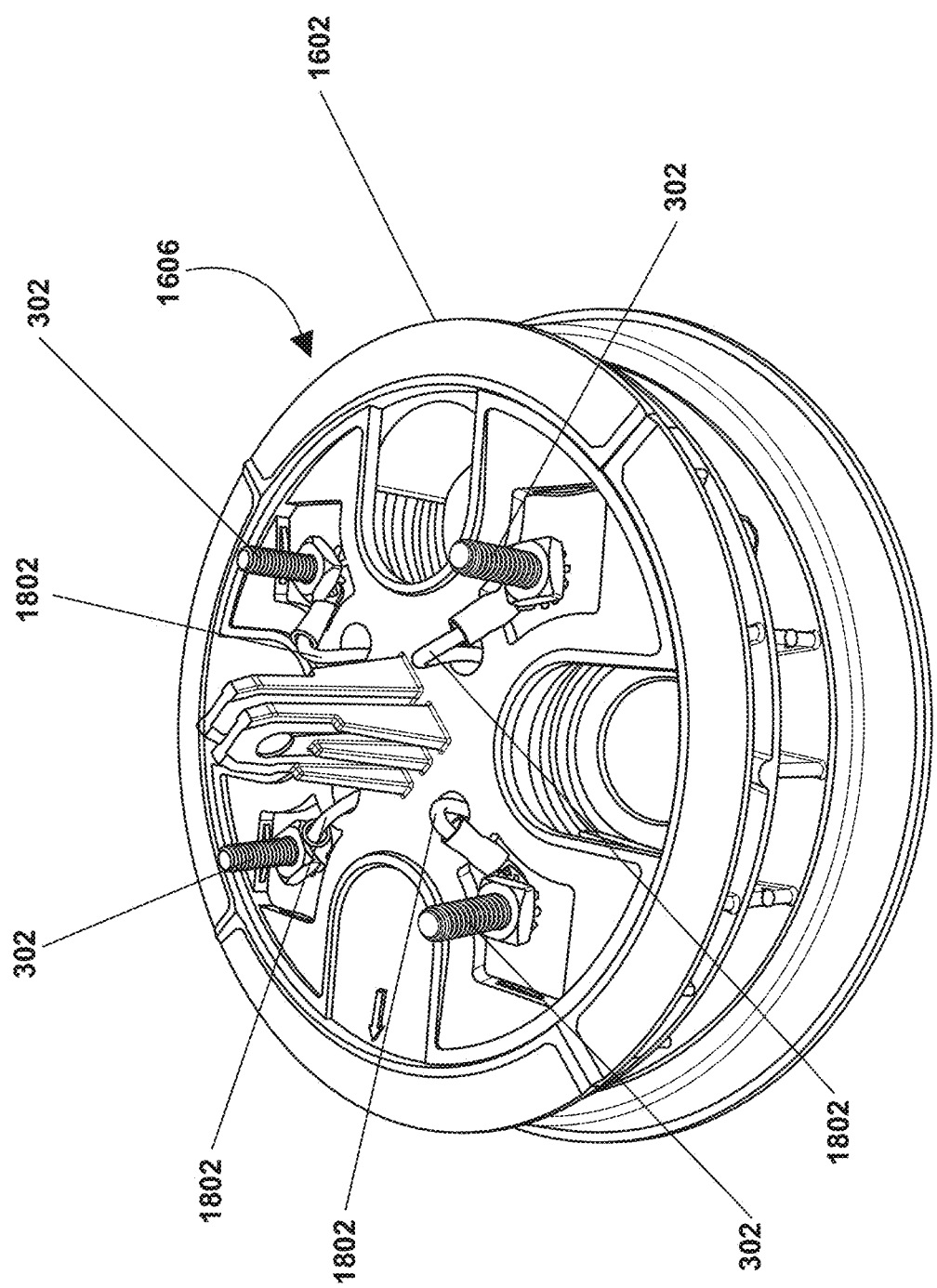
FIG. 18 is an illustration of an example end plate for a cable enclosure.

Referring to FIG. 18, the second side 1606 of the end plate 1602 is shown. The end plate 1602 can include an electrical conductor 1802 (e.g. a wire) where one conductor completes an electrical connection between one of the conductive legs 1710, 1712, 1714, 1716 (shown in FIG. 17) and one of the ground studs 302 and one telecommunication cable 106 within the housing 202. While not shown, it is to be understood that the conductive member 1608 includes a pathway for electrical communication between each of the first connector 1702, the second connector 1704, the third connector 1706, and the fourth connector 1708. For example, each of the connectors 1702, 1704, 1706, 1708 can extend from a common, electrically conductive plate. In an example, each of the connectors 1702, 1704, 1706, 1708 can be connected by electrical conductors such as wires. As such, when the conductive member 1608 is placed in the first position as shown in FIG. 16, all of the conductive legs 1710, 1712, 1714, 1716 are in electrical communication with each other through the conductive member 1608. By virtue of the electrical communication between the conductive legs 1710, 1712, 1714, 1716 and the telecommunication cables 106 within the housing 202, placement of the conductive member 1608 in the first position electrically bonds all of the telecommunication cables 106 to each other.

Returning to FIG. 17, when the conductive member 1608 is in the second position, the first connector 1702 is not in electrical communication with the first conductive leg 1710. Also, when the conductive member 1608 is in the second position, the second connector 1704 is not in electrical communication with the second conductive leg 1712. Furthermore, when the conductive member 1608 is in the second position, the third connector 1706 and the fourth connector 1708 are not in electrical communication with the third conductive leg 1714 and the fourth conductive leg 1716, respectively.

In an example, the plug is a two-position conductive member 1608 that can be alternately moved between a first position that electrically bonds all of the telecommunication cables 106 to each other to a second position such that all of the telecommunication cables 106 are not bonded to each other.

Similar to other examples, the conductive member 1608 can be operated externally to the cable enclosure 104. External operation of the conductive member 1608 (e.g., the plug) can be beneficial to eliminate the need for a utility worker to open the housing, remove the electrical bonding connection for at least one telecommunication cable, conduct a desired operation, and then bond the telecommunication cables together again, and re-close the housing. In an example, a seal can be placed between the receiving member 1610 and the end plate 1602 to help reduce or eliminate dust, dirt, moisture, etc. penetration into the housing 202.

Figure 19:
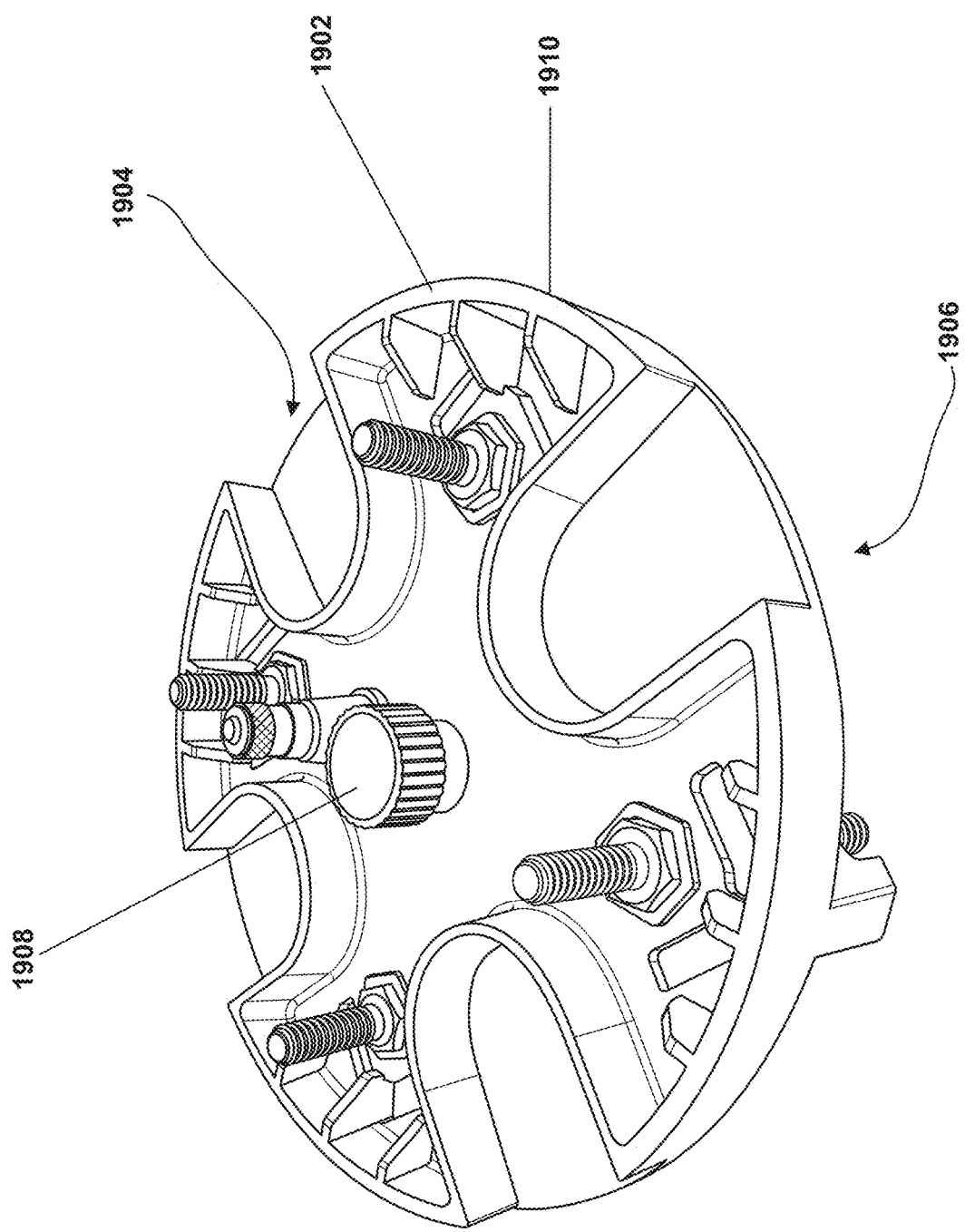
FIG. 19 is an illustration of an example end plate for a cable enclosure.

Referring to FIG. 19, an example end plate 1902 includes a first side 1904 facing an exterior of the housing 202 (shown in FIG. 2). The end plate 1902 also includes a second side 1906 (shown in FIG. 20). The end plate 1902 includes a rotatable knob 1908 located on the first side 1904 of the end plate 1902. Additionally, the end plate 1902 can include a main portion 1910 having outside dimensions that are similar to the dimensions of the opening 204 defined by the housing 202 (shown in FIG. 2).

Figure 20:
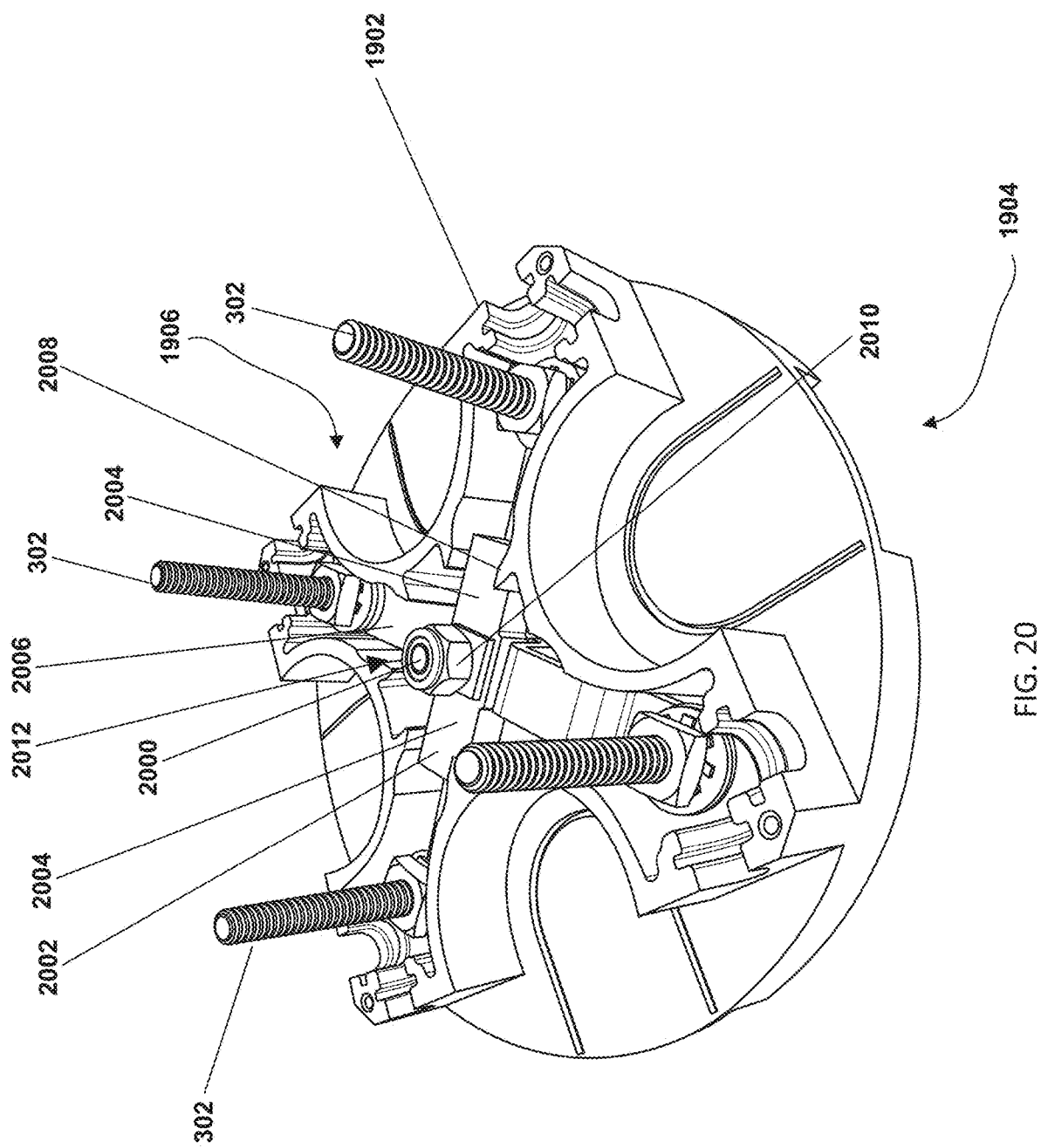
FIG. 20 is an illustration of an example end plate for a cable enclosure.

Referring to FIG. 20, the second side 1906 of the end plate 1902 is shown. As with previous examples, the second side 1906 faces the interior of the housing 202. A threaded rod 2000 is attached to the rotatable knob 1908 (shown in FIG. 19) such that rotation of the rotatable knob 1908 rotates the threaded rod 2000. The threaded rod 2000 passes through the end plate 1902 from the first side 1904 to the second side 1906. Additionally, a conductive member 2002 is threadingly engaged to the threaded rod 2000 such that rotation of the rotatable knob 1908 rotates the threaded rod 2000 to move the conductive member 2002 from a first position to a second position.

As shown in FIG. 20, the conductive member 2002 can be rectangular shaped and include two arms 2004. The rectangular shape is merely one example of possible shapes of the conductive member 2002. The arms 2004 contact a number of conductive legs 2006 extending from the ground studs 302. FIGS. 21-25 show the conductive legs 2006 in greater detail. Returning to FIG. 20, the example end plate 1902 is configured for use with a cable enclosure 104 having four telecommunication cables 106 within the housing 202, however, any suitable number of telecommunication cables 106 is also contemplated. In an example, the end plate 1902 will include one ground stud 302 for each telecommunication cable 106.

In an example, the end plate 1902 can include structures 2008 designed to prevent rotation of the conductive member 2002 relative to the end plate 1902. In an example, the structures 2008 are walls that present a physical interference to prevent the conductive member 2002 from rotating with the threaded rod 2000. Because the threaded rod 2000 and the conductive member 2002 are threadingly engaged and the conductive member 2002 is prevented from rotating, the conductive member 2002 is urged in a linear direction parallel to the central axis 208 as the threaded rod 2000 rotates. In other words, when a utility worker rotates the rotatable knob 1908, the conductive member 2002 will translate in a linear direction parallel to the central axis 208 to and from a first position to a second position.

Additionally, a nut 2010 can be attached to a lower end 2012 of the threaded rod 2000 so that the nut 2010 and the threaded rod 2000 rotate together. In other words, the nut 2010 can be fixed to the threaded rod 2000 such that there is no relative rotation between the nut 2010 and the threaded rod 2000 and rotation of the threaded rod 2000 does not urge the nut 2010 in a linear direction parallel to the central axis 208. This arrangement enables the nut 2010 to be a hard stop for the conductive member 2002 as it moves away from the end plate 1902. The nut 2010 is only one example of a hard stop located at a distal position of the threaded rod 2000, and any suitable structure is acceptable. Similarly, a surface of the end plate 1902 can serve as a hard stop for the conductive member 2002 as it moves toward the end plate 1902.

Figure 21:
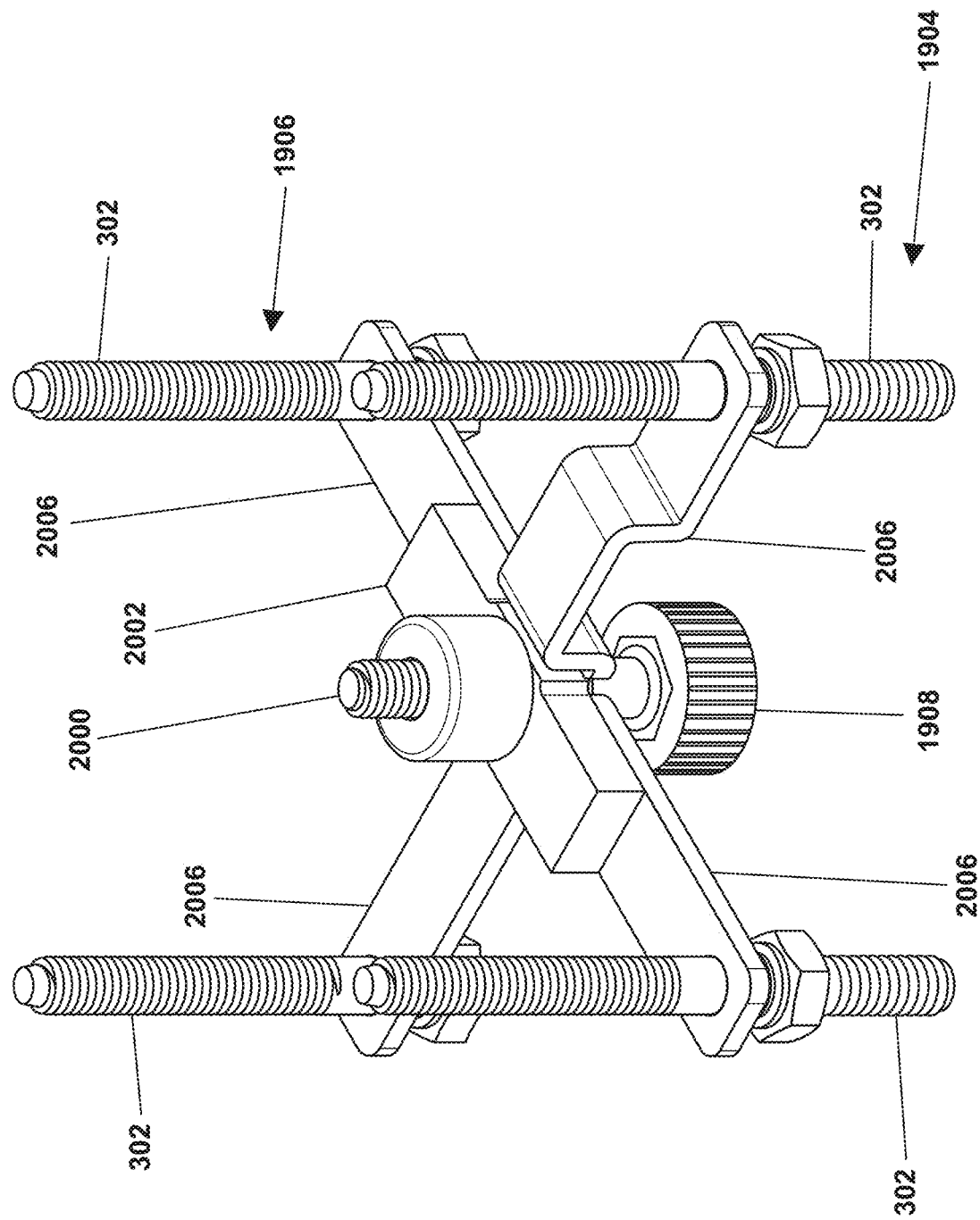
FIG. 21 is an illustration of example components for an end plate.

Referring to FIG. 21, a perspective view of selected components of the end plate 1902 is shown without the main portion 1910 of the end plate 1902 for clarity. As with other examples of the end plate 1902, at least one ground stud 302 is in electrical communication with a conductive sheath of a telecommunication cable 106 (shown in FIG. 1). A conductive leg 2006 is, in turn, in electrical communication with the ground stud 302. The conductive leg 2006 is configured to be contacted by the conductive member 2002 when it is in the first position as shown in FIG. 21. In an example as shown in FIG. 21, the conductive member can be generally rectangular and is configured to contact a portion of all four conductive legs 2006. As with other examples, when the conductive member is located in the first position, each of the conductive legs 2006, and thus the ground studs 302 and the telecommunication cables 106 are electrically bonded to each other.

As previously discussed, the threaded rod 2000 passes through the main portion 1910 of the end plate 1902 from the first side 1904 to the second side 1906. As the rotatable knob 1908 is rotated, the attachment between the rotatable knob 1908 and the threaded rod 2000 enables the rotational force to be transferred from the rotatable knob 1908 to the threaded rod 2000 to rotate the threaded rod 2000. This rotation urges the conductive member 2002 to move in a linear direction parallel to the central axis 208 between the first position and the second position.

Figure 22:
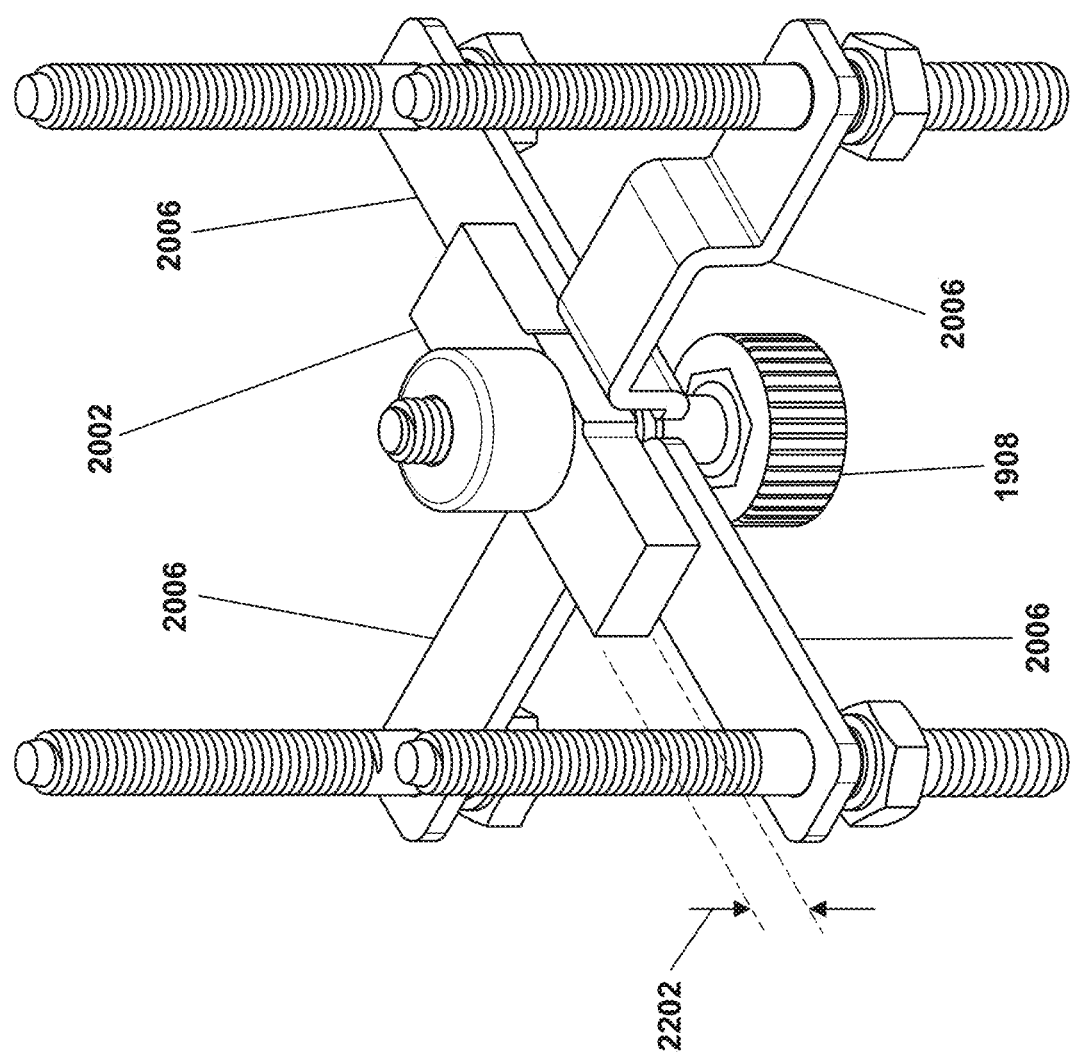
FIG. 22 is an illustration of example components for an end plate.

Referring to FIG. 22, the conductive member 2002 is shown in the second position after rotation of the rotatable knob 1908. The dimension 2202 represents a physical distance that separates the conductive member 2002 from the conductive legs 2006. This distance 2202 removes the electrical communication between the conductive legs 2006, and thus removes the electrical bonding between the telecommunication cables 106. It is worthy of note that the conductive legs 2006 are not in electrical communication (e.g., in physical contact) with one another when they are not in contact with the conductive member 2002.

Figure 23:
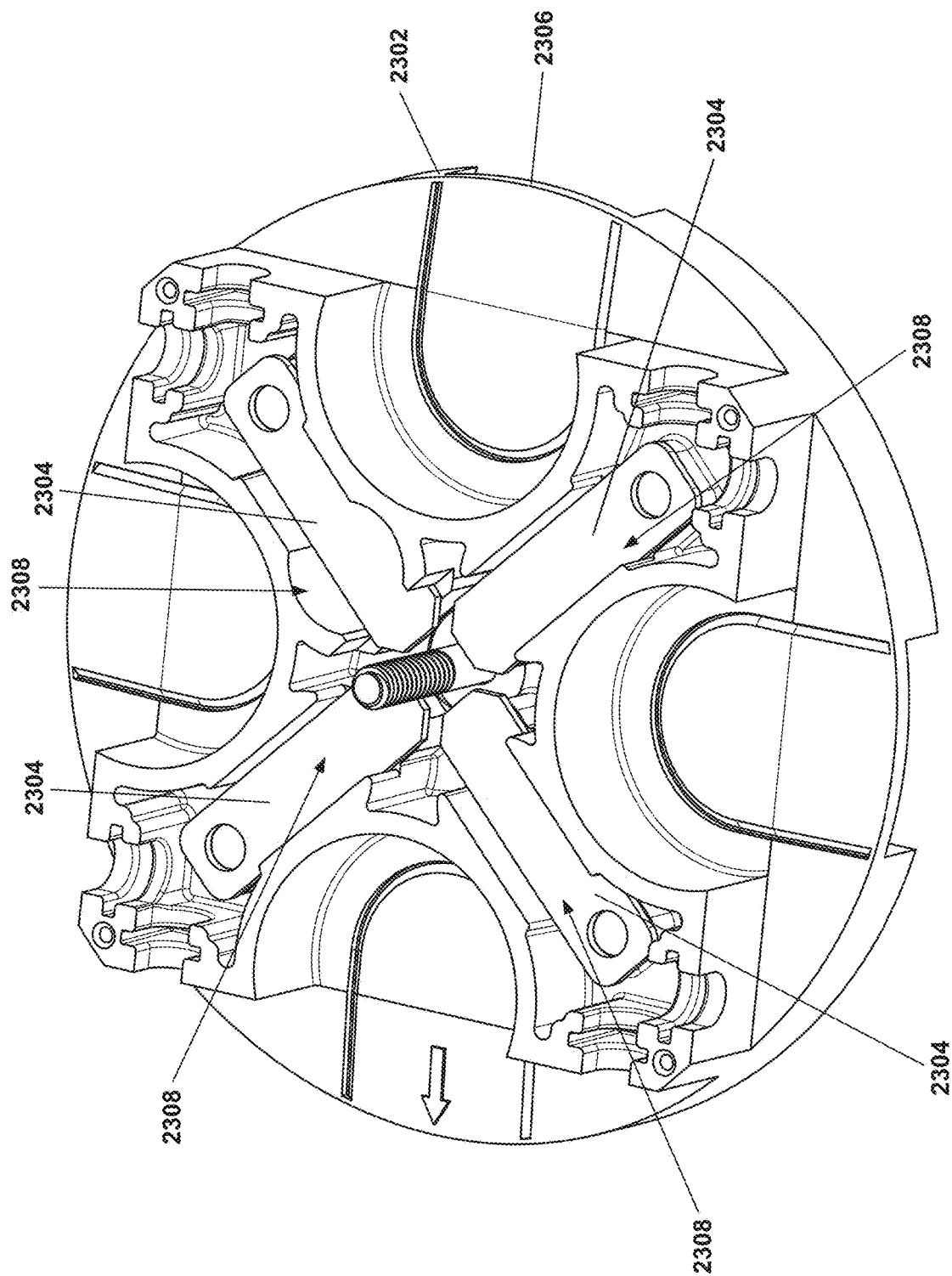
FIG. 23 is an illustration of an example end plate for a cable enclosure.

Referring to FIG. 23, an example end plate 2302 is shown with several components removed for clarity. FIG. 23 demonstrates the physical separation of the conductive legs 2304 such that electrical bonding of the telecommunication cables 106 does not take place without the physical contact of the conductive member. The main portion 2306 of the end plate 2302 can include channels 2308 for ease of location of the conductive legs 2304. Furthermore, FIG. 23 also demonstrates that the conductive legs 2304 can be positioned to radiate from a central location such that a relatively small conductive member can be used to contact each conductive leg 2304.

Figure 24:
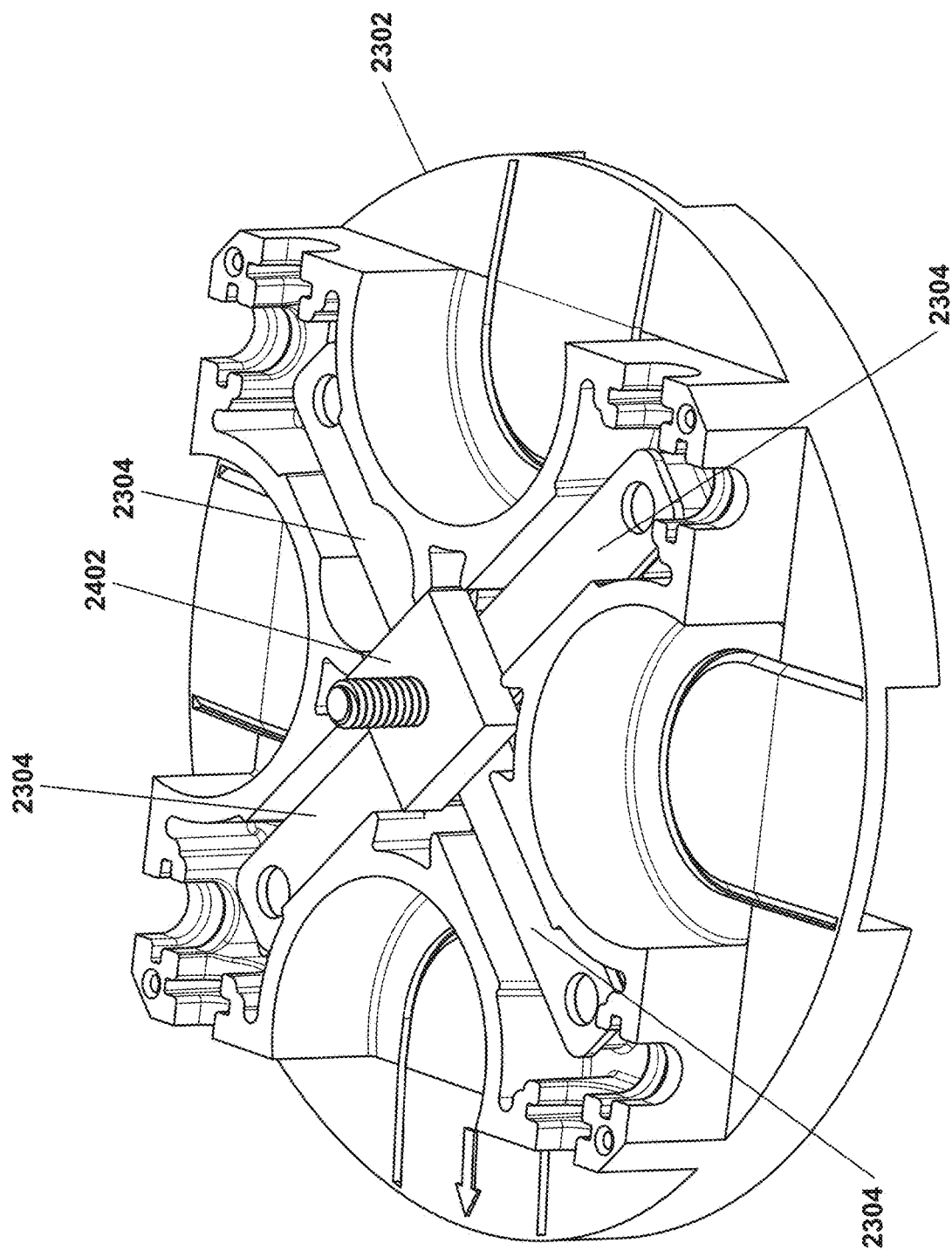
FIG. 24 is an illustration of an example end plate for a cable enclosure.

Turning to FIG. 24, the end plate 2302 is shown with the conductive member 2402 in the first position. In an example, the conductive member 2402 can be a square prism. Multiple other shapes and configurations of the conductive member 2402 are also contemplated.

Figure 25:
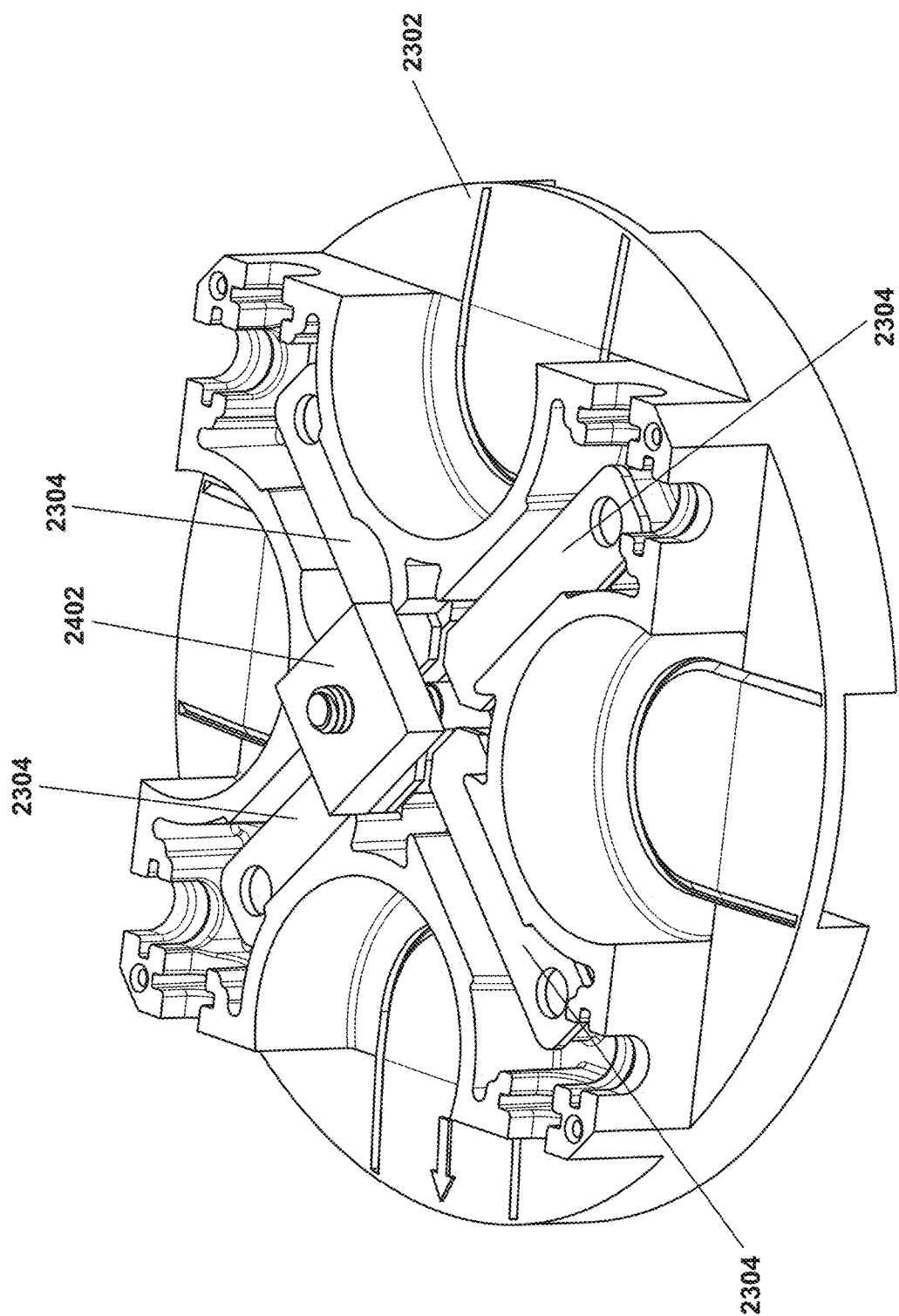
FIG. 25 is an illustration of an example end plate for a cable enclosure.

Referring to FIG. 25, the end plate 2302 is shown with the conductive member 2402 in the second position. In an example, the conductive member 2402 can be a square prism configured to contact each conductive leg 2304 while having a minimal separation distance between the individual conductive legs 2304 near the center of the end plate 2302.

In the previously described examples, devices such as the rotatable knob 1908 shown in FIG. 19 or the switch 1108 shown in FIG. 11 enable electrical bonding and removal from electrical bonding of a number of telecommunication cables from the exterior of the cable enclosure. Each of these devices have been described as being mounted to the end plate. However, further examples include these devices mounted to the housing rather than the end plate.

Figure 26:
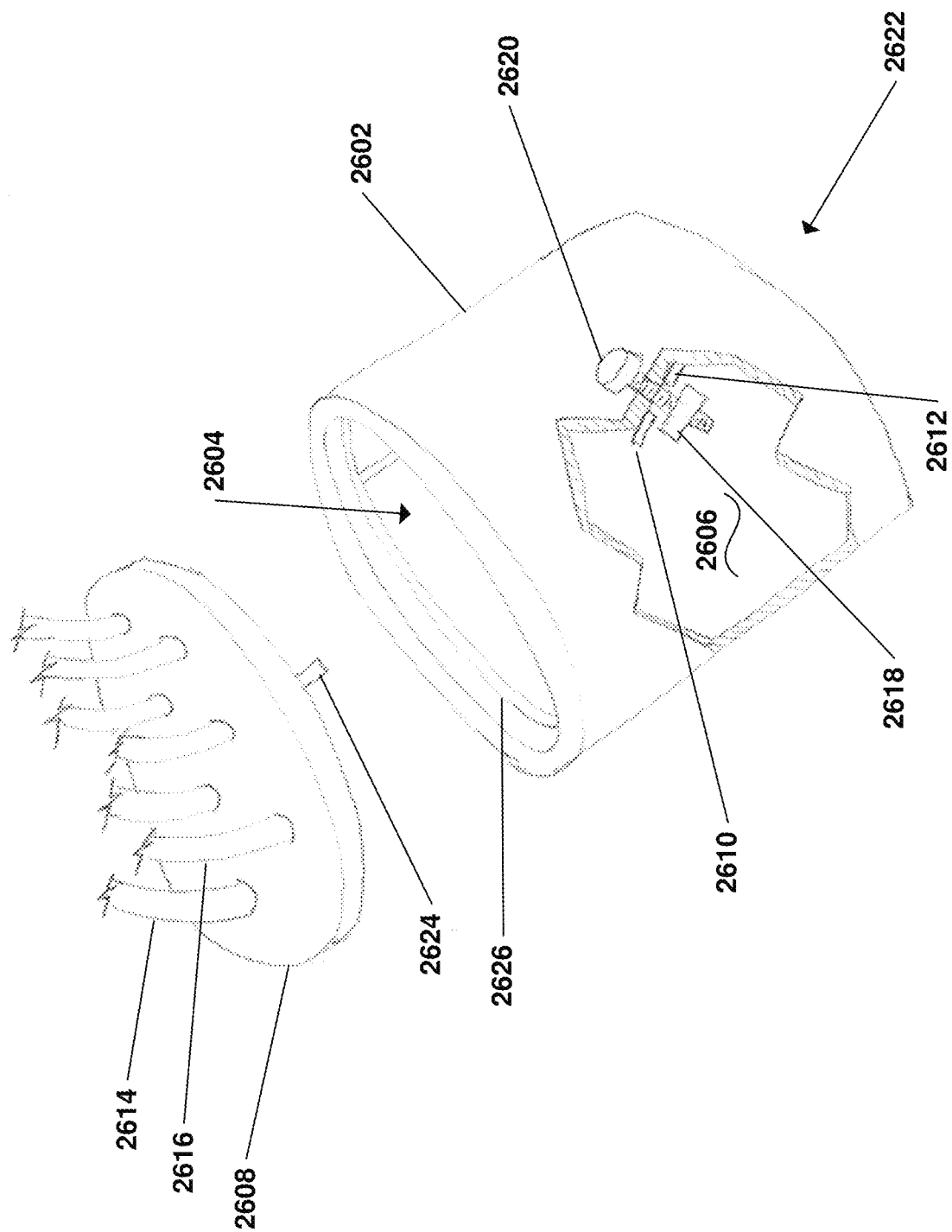
FIG. 26 is a cut-away illustration of a housing of a cable enclosure.

Referring to FIG. 26, an example cable enclosure 2600 includes a housing 2602 defining an opening 2604 through which an interior 2606 of the housing 2602 is accessible. The cable enclosure 2600 also includes an end plate 2608 that is releasably secured to the housing 2602 to cover the opening 2604. Similar to other examples, when the end plate 2608 is secured to the housing 2602, the interior 2606 of the housing 2602 is not accessible. In the shown example, the housing 2602 includes a device that is included on the end plate in other examples. For example, the housing 2602 includes a first conductive leg 2610 and a second conductive leg 2612 in electrical communication with a first cable 2614 and a second cable 2616, respectively, within the housing 2602.

A conductive member 2618 is shown schematically in FIG. 26 and is movable between a first position and a second position, similar to previously described examples. When in the first position, the conductive member 2618 is in contact with the first conductive leg 2610 and the second conductive leg 2612. When in the second position, the conductive member 2618 is not in contact with at least one of the first conductive leg 2610 or the second conductive leg 2612.

In an example, the conductive member 2618 can be urged to and from the first position and the second position using any suitable devices and structures. FIG. 26 shows a rotatable knob 2620 similar to or the same as the rotatable knob 1908 shown in FIG. 19. However, the rotatable knob 2620 is only one example of a device that can urge the conductive member 2618 between the first position and the second position. Other examples of suitable devices can include switches, push buttons, etc. In the shown example, the rotatable knob 1908 is located on the side of the housing 2602, but could also be located on the end 2622 of the housing 2602 that is opposite the opening 2604.

The device (e.g., rotatable knob 2620) used to urge the conductive member 2618 to and from the first position and the second position is configured to pass through the housing 2602 such that a utility worker can place the telecommunication cables into an electrically bonded state and remove the telecommunication cables from the electrically bonded state while maintaining the end plate 2608 in a position secured to the housing 2602.

In the shown example, it may be advantageous to include a selectably releasable electrical connection 2624 extending from the end plate 2608 to an electrical connection 2626 attached to the housing 2602. The electrical connections 2624, 2626 can be placed into and out of contact with each other (e.g., selectably releasable) as the end plate 2608 is secured to and removed from the housing 2602, respectively. The selectably releasable electrical connection between the end plate 1608 and the housing 2602 enables the endplate 1608 and the attached telecommunication cables 2614, 2616 and splices to be relatively easy to remove from the housing 2602 permitting a utility worker to conduct work on the cables, splices, and other structures normally located within the housing 2602.

It is worthy of note that FIG. 26 omits several components that can be attached to the side of the end plate 2608 that faces the interior 2606 of the housing 2602. FIG. 26 also omits any representation of the telecommunication cables and splices that are attached to the end plate 2608 and extend into the interior 2606 of the housing 2602 when the end plate 2608 is secured to the housing 2602.

Referring to FIG. 27, an example end plate 2702 is shown with several components removed for clarity and simplicity in order to illustrate an example structure to place a ground stud 302 into electrical communication with the conductive metal sheath of an individual telecommunication cable 106. The end plate 2702 is shown from the second side 2704 facing the interior of the housing (not shown). As with other examples, the second side 2704 is opposite the first side 2706 which faces the exterior of the housing. As previously described, the ground stud 302 can pass through the end plate 2702.

In the shown example, a connection assembly 2708 is used to physically connect the ground stud 302 to the conductive metal sheath of an individual telecommunication cable 106 and also secure the telecommunication cable 106 to the end plate 2702. The shown connection assembly 2708 is but one example of structure that can place the ground stud 302 and the telecommunication cable 106 into electrical communication, and other suitable structures and methods are contemplated. A utility worker may slice an exterior sheath 2710 of the telecommunication cable 106 to enable two approximate halves of the exterior sheath 2710 to be separated slightly.

A shield connector 2712 can include a shield connector base 2714 and a shield connector top 2716. A portion of a shield connector base 2714 is placed within the telecommunication cable 106, inside the exterior sheath. In this position, the shield connector base 2714 is in contact with the conductive metal sheath of the telecommunication cable 106 to effect electrical communication between the shield connector 2712 and the conductive metal sheath. The shield connector base 2714 is attached to a threaded stud 2718. The shield connector top 2716 cooperates with the threaded stud 2718 as the threaded stud 2718 passes through an aperture (not shown) defined by the shield connector top 2716. A nut (not shown) or other fastener can secure the shield connector top 2716 to the shield connector base 2714, thereby securing the shield connector 2712 to the telecommunication cable 106.

In the shown example, the connection assembly 2708 includes an L-bracket 2720. In an example, the telecommunication cable 106 includes a strength member 2722, and the end of the strength member 2722 can be placed between an end cap 2724 and the L-bracket 2720. The end cap 2724 can be attached to a threaded stud 2726 that passes through an aperture defined by the L-bracket 2720. A nut 2728 can tighten and secure the end cap 2724 to the L-bracket 2720 and also secure the strength member 2722 to the connection assembly 2708.

The threaded stud 2718 can pass through an aperture (not shown) in the L-bracket 2720 and cooperate with a nut 2730 or other fastener to secure the shield connector 2712 to the L-bracket 2720. The telecommunication cable 106 can be further secured to the L-bracket 2720 with the use of a hose clamp 2732 or other structure. The L-bracket 2720 can then be secured to the ground stud 302 with the use of a nut 2734 or other fastener. Fiber optic cables 2736 can pass into the interior of the housing to splice trays or other structures. In summary, the metal conductive sheath of the telecommunication cable 106 of the shown example is placed into electrical communication with the ground stud 302 through the shield connector 2712, through the threaded stud 2726, through the nut 2728, through the L-bracket 2720, and through the nut 2734.

Figure 28:
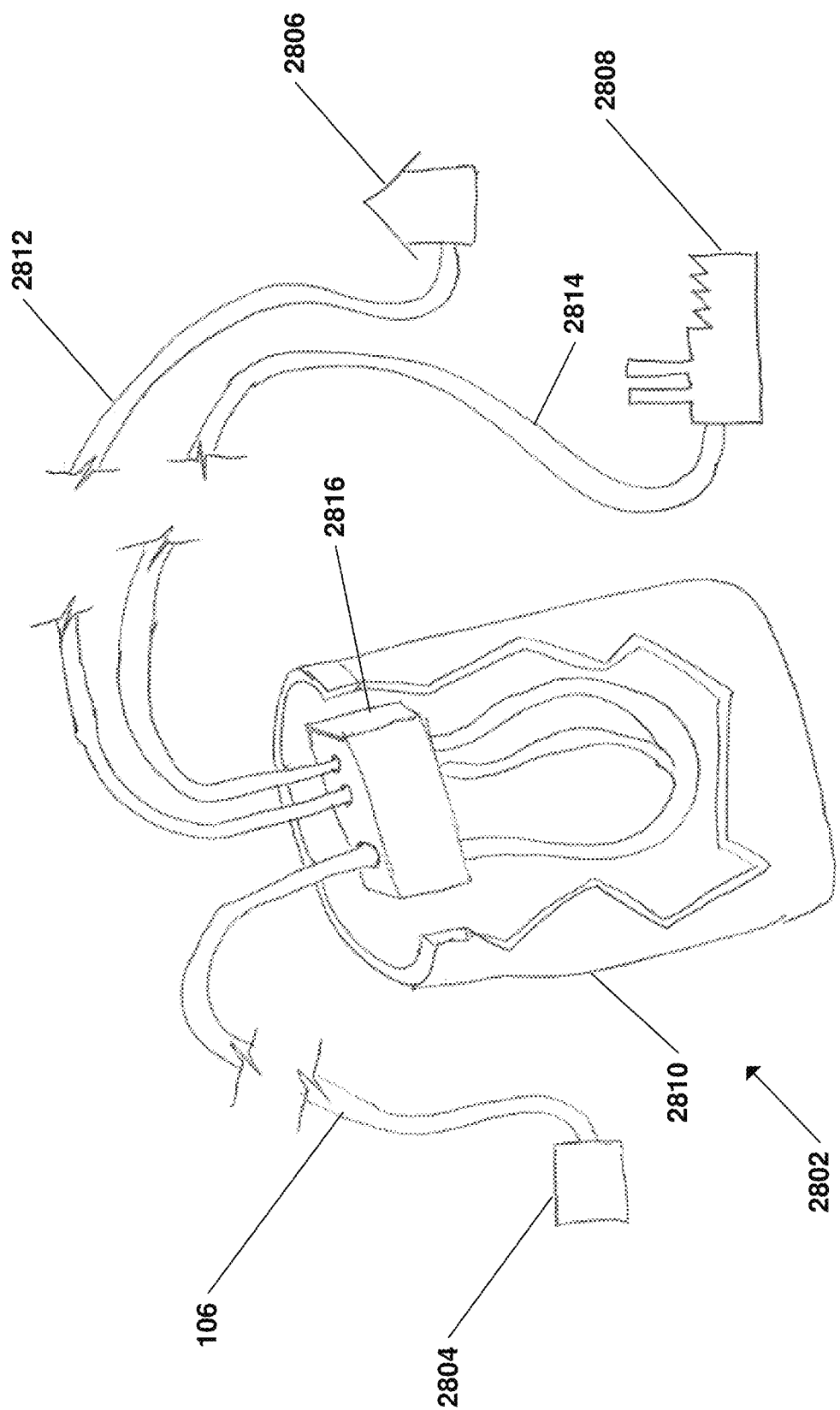
FIG. 28 is an illustration of an example cable enclosure within a telecommunication network.

Referring to FIG. 28, a general overview of an example cable enclosure 2802 within a telecommunication network is shown schematically. The telecommunication cable 106 enables signals to be delivered from a central station 2804 to end users, consumers, etc. at locations such as a home 2806, a place of business 2808, a multi-unit dwelling, etc. In the shown example, the telecommunication cable 106 passes into a housing 2810 of the cable enclosure 2802. As shown in the cut-away view of the housing 2810, the telecommunication cable 106 can be spliced such that a plurality of telecommunication cables 2812, 2814 deliver content to various locations 2806, 2808. Thus, the ratio of telecommunication cables 106 entering the cable enclosure 2802 to telecommunication cables 2812, 2814 leaving the cable enclosure 2802 is not 1:1. The telecommunication cables 106, 2812, 2814 interact with a conductive member 2816 that is part of the cable enclosure 2802. The conductive member 2816 is shown schematically, and can include any of the previously described conductive members of this disclosure. The conductive member 2816 can be moved from a first position wherein the conductive sheaths of all the telecommunication cables 106, 2812, 2814 are electrically bonded together to a second position wherein the conductive sheaths of all the telecommunication cables 106, 2812, 2814 are not electrically bonded together.

Figure 29:
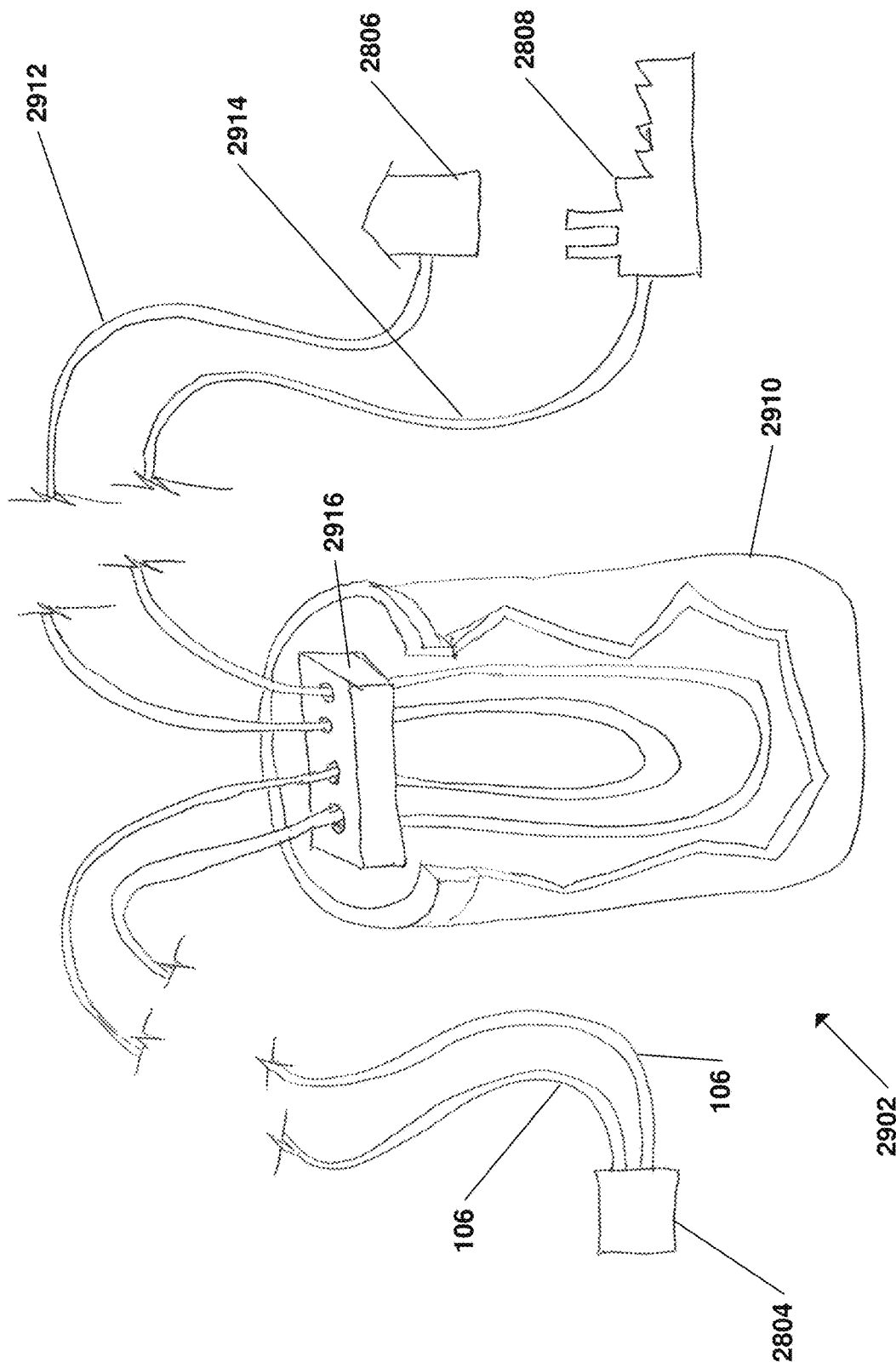
FIG. 29 is an illustration of an example cable enclosure within a telecommunication network.

Referring to FIG. 29, a general overview of an example cable enclosure 2902 within a telecommunication network is shown schematically. As with the previous example, the telecommunication cable 106 enables signals to be delivered from a central station 2804 to end users, consumers, etc. at locations such as a home 2806, a place of business 2808, a multi-unit dwelling, etc. In the shown example, the telecommunication cable 106 passes into a housing 2810 of the cable enclosure 2902. As shown within the cut-away view of the housing 2810, the ends of telecommunication cables 106 can be spliced to the ends of other telecommunication cables 2912, 2914 to deliver content to various locations 2806, 2808. Thus, the ratio of telecommunication cables 106 entering the cable enclosure 2902 to telecommunication cables 2912, 2914 leaving the cable enclosure 2902 is 1:1. The telecommunication cables 106, 2912, 2914 interact with a conductive member 2916 that is part of the cable enclosure 2802. The conductive member 2916 is shown schematically, and can include any of the previously described conductive members of this disclosure. The conductive member 2916 can be moved from a first position wherein the conductive sheaths of all the telecommunication cables 106, 2912, 2914 are electrically bonded together to a second position wherein the conductive sheaths of all the telecommunication cables 106, 2912, 2914 are not electrically bonded together.

The structures and apparatus described in this disclosure can provide several benefits. Among them, a telecommunication cable can be individually selected to remove an electrical bond between the telecommunication cable and a number of other telecommunication cables within the same cable enclosure. This can be done relatively quickly and reliably from an exterior portion of a cable enclosure, thereby reducing the time and effort required to select one telecommunication cable and remove it from electrical bonding from the other telecommunication cables. Additionally, a utility worker can operate one device, such as a rotatable knob, switch, etc. to place the telecommunication cables into an electrically bonded state. Furthermore, a relatively quick movement can be done to place a set of telecommunication cables into an electrically bonded condition or remove the cables from the electrically bonded condition while the cable enclosure remains closed and sealed. Each of these benefits can be realized without the need for additional hand tools and manipulation of several fasteners to open the cable enclosure.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each example provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A cable enclosure comprising:
    a housing defining an opening through which an interior of the housing is accessible; and
    an end plate releasably secured to the housing to cover the opening such that the interior of the housing is not accessible, the end plate comprising:
        a first conductive leg in electrical communication with a first cable within the interior of the housing;
        a second conductive leg in electrical communication with a second cable within the interior of the housing; and
        a conductive member movable between a first position and a second position, wherein:
            when in the first position, the conductive member is in contact with the first conductive leg and the second conductive leg, and
            when in the second position, the conductive member is not in contact with at least one of the first conductive leg or the second conductive leg,
        wherein the housing extends along a central axis and the conductive member translates in a direction parallel to the central axis when the conductive member is moved between the first position and the second position.

2. The cable enclosure of claim 1, wherein the end plate comprises:
    a third conductive leg in electrical communication with a third cable within the interior of the housing, wherein:
        when the conductive member is in the first position, the conductive member is in contact with the third conductive leg such that the third conductive leg is in electrical communication with the first conductive leg and the second conductive leg through the conductive member,
        when the conductive member is in the second position, the second conductive leg is removable from the end plate, and
        when the second conductive leg is removed from the end plate and the conductive member is in the first position, the conductive member is in contact with the first conductive leg and the third conductive leg such that the first conductive leg is in electrical communication with the third conductive leg through the conductive member, but not in electrical communication with the second conductive leg.

3. The cable enclosure of claim 1, wherein the conductive member is toroidal.

4. The cable enclosure of claim 1, wherein the end plate comprises:
    a nonconductive member comprising:
        a first portion that cooperates with a portion of the first conductive leg and a portion of the second conductive leg; and
        a second portion that cooperates with the conductive member.

5. The cable enclosure of claim 4, wherein the first portion comprises:
    a first arm cooperating with the portion of the first conductive leg; and
    a second arm cooperating with the portion of the second conductive leg.

6. The cable enclosure of claim 5, wherein the first conductive leg and the second conductive leg are separated by a distance when the first arm is cooperating with the portion of the first conductive leg and the second arm is cooperating with the portion of the second conductive leg.

7. The cable enclosure of claim 5, wherein the first arm includes a feature providing a snap fit with the portion of the first conductive leg when the first arm cooperates with the portion of the first conductive leg.

8. The cable enclosure of claim 5, wherein:
    the portion of the first conductive leg lies within a plane when cooperating with the first arm,
    the portion of the second conductive leg lies within the plane when cooperating with the second arm, and
    the conductive member concurrently contacts the first conductive leg and the second conductive leg when moved from the second position to the first position.

9. The cable enclosure of claim 5, wherein cooperation of the first arm with the portion of the first conductive leg is independent of cooperation of the second arm with the portion of the second conductive leg.

10. The cable enclosure of claim 4, wherein the conductive member comprises a cap that cooperates with the second portion of the nonconductive member.

11. The cable enclosure of claim 1, wherein at least one of the first conductive leg or the second conductive leg is not planar.

12. The cable enclosure of claim 1, wherein the end plate comprises:
    a first side facing an exterior of the housing; and
    a second side facing the interior of the housing, wherein the conductive member comprises a switch attached to the first side of the end plate.

13. The cable enclosure of claim 12, wherein the switch comprises:
    a first cable pin; and
    a second cable pin, wherein:
        when the conductive member is in the first position, the first cable pin is in electrical communication with the first conductive leg,
        when the conductive member is in the first position, the second cable pin is in electrical communication with the second conductive leg,
        when the conductive member is in the second position, the first cable pin is not in electrical communication with the first conductive leg, and when the conductive member is in the second position, the second cable pin is not in electrical communication with the second conductive leg.

14. The cable enclosure of claim 1, wherein the housing extends along the central axis and the conductive member rotates about an axis parallel to the central axis when the conductive member is moved between the first position and the second position.

15. The cable enclosure of claim 1, wherein the end plate comprises:
   a first side facing an exterior of the housing; and
   a second side facing the interior of the housing, wherein the conductive member comprises a plug removably attached to the first side of the end plate.

16. The cable enclosure of claim 15, wherein the plug comprises:
   a first connector; and
   a second connector, wherein:
      when the conductive member is in the first position, the first connector is in electrical communication with the first conductive leg,
      when the conductive member is in the first position, the second connector is in electrical communication with the second conductive leg,
      when the conductive member is in the second position, the first connector is not in electrical communication with the first conductive leg, and
      when the conductive member is in the second position, the second connector is not in electrical communication with the second conductive leg.

17. The cable enclosure of claim 1, wherein the end plate comprises:
   a first side facing an exterior of the housing;
   a second side facing the interior of the housing;
   a rotatable knob located on the first side of the end plate; and
   a threaded rod attached to the rotatable knob, wherein the conductive member is threadingly engaged to the threaded rod, such that rotation of the rotatable knob rotates the threaded rod to move the conductive member from the first position to the second position.

18. A cable enclosure comprising:
   a housing defining an opening through which an interior of the housing is accessible; and
   an end plate releasably secured to the housing between a first orientation relative to the housing and a second orientation relative to the housing, wherein in the first orientation, the end plate does not cover the opening such that the interior of the housing is accessible and in the second orientation the end plate covers the opening such that the interior of the housing is not accessible, the end plate comprising:
      a first conductive leg in electrical communication with a first cable within the interior of the housing;
      a second conductive leg in electrical communication with a second cable within the interior of the housing; and
      a conductive member movable between a first position and a second position when the end plate is in the second orientation relative to the housing, wherein:
         when in the first position, the conductive member is in contact with the first conductive leg and the second conductive leg, and
         when in the second position, the conductive member is not in contact with at least one of the first conductive leg or the second conductive leg, wherein the housing extends along a central axis and the conductive member rotates about an axis parallel to the central axis when the conductive member is moved between the first position and the second position.

19. An end plate for a cable enclosure comprising:
   a first side;
   a second side, wherein:
      the end plate is releasably secured to an opening defined by a housing of the cable enclosure such that an interior of the housing is not accessible,
      the first side faces an exterior of the housing, and
      the second side faces the interior of the housing,
   a first conductive leg in electrical communication with a first cable within the interior of the housing;
   a second conductive leg in electrical communication with a second cable within the interior of the housing; and
   a conductive member comprising a plug removably attached to the first side and movable between a first position and a second position, wherein:
      when in the first position, the conductive member is in contact with the first conductive leg and the second conductive leg, and
      when in the second position, the conductive member is not in contact with at least one of the first conductive leg or the second conductive leg.

20. A cable enclosure comprising:
   a housing comprising:
      a first side defining an exterior of the housing; and
      a second side defining an interior of the housing;
   a first conductive leg in electrical communication with a first cable within the interior of the housing;
   a second conductive leg in electrical communication with a second cable within the interior of the housing; and
   a conductive member that is toroidal and operatively coupled to the first side and movable between a first position and a second position, wherein:
      when in the first position, the conductive member is in contact with the first conductive leg and the second conductive leg,
      when in the second position, the conductive member is not in contact with at least one of the first conductive leg or the second conductive leg, and
      the housing extends along a central axis and the conductive member translates in a direction parallel to the central axis when the conductive member is moved between the first position and the second position.

* * * * *